(12) United States Patent
Hennesy

(10) Patent No.: US 10,666,064 B2
(45) Date of Patent: May 26, 2020

(54) BATTERY PACK CHARGER SYSTEM

(71) Applicant: Black & Decker Inc., Newark, DE (US)

(72) Inventor: Timothy J. Hennesy, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 156 days.

(21) Appl. No.: 15/854,021

(22) Filed: Dec. 26, 2017

(65) Prior Publication Data

US 2019/0199101 A1 Jun. 27, 2019

(51) Int. Cl.
*H02J 7/00* (2006.01)

(52) U.S. Cl.
CPC .......... *H02J 7/0004* (2013.01); *H02J 7/0013* (2013.01); *H02J 7/0031* (2013.01); *H02J 7/0044* (2013.01); *H02J 7/0045* (2013.01); *H02J 7/0088* (2013.01)

(58) Field of Classification Search
CPC .................................................... H02J 7/0045
USPC ......................................................... 320/110
See application file for complete search history.

(56) References Cited

U.S. PATENT DOCUMENTS

| 6,018,227 A * | 1/2000 | Kumar | H01M 10/4257 320/106 |
| 2004/0204056 A1* | 10/2004 | Phelps, III | H02J 7/0044 455/556.1 |
| 2016/0172722 A1* | 6/2016 | Rejman | H01M 10/488 362/119 |

* cited by examiner

*Primary Examiner* — Edward Tso
*Assistant Examiner* — Ahmed H Omar
(74) *Attorney, Agent, or Firm* — Michael Aronoff

(57) ABSTRACT

A battery pack charger system includes one or more charging ports for charging one or more removable battery packs. Each of the one or more charging ports may receive a plurality of different removable battery packs for charging. Each of the one or more charging ports may to receive at least a first battery pack having a first external physical interface and a second battery pack having a second external physical interface. Each of the one or more charging ports may include a first feature that secures, or retains, or locks the first battery pack in the charging port, and a second feature that secures, or retains, or locks the second battery pack in the charging port.

20 Claims, 29 Drawing Sheets

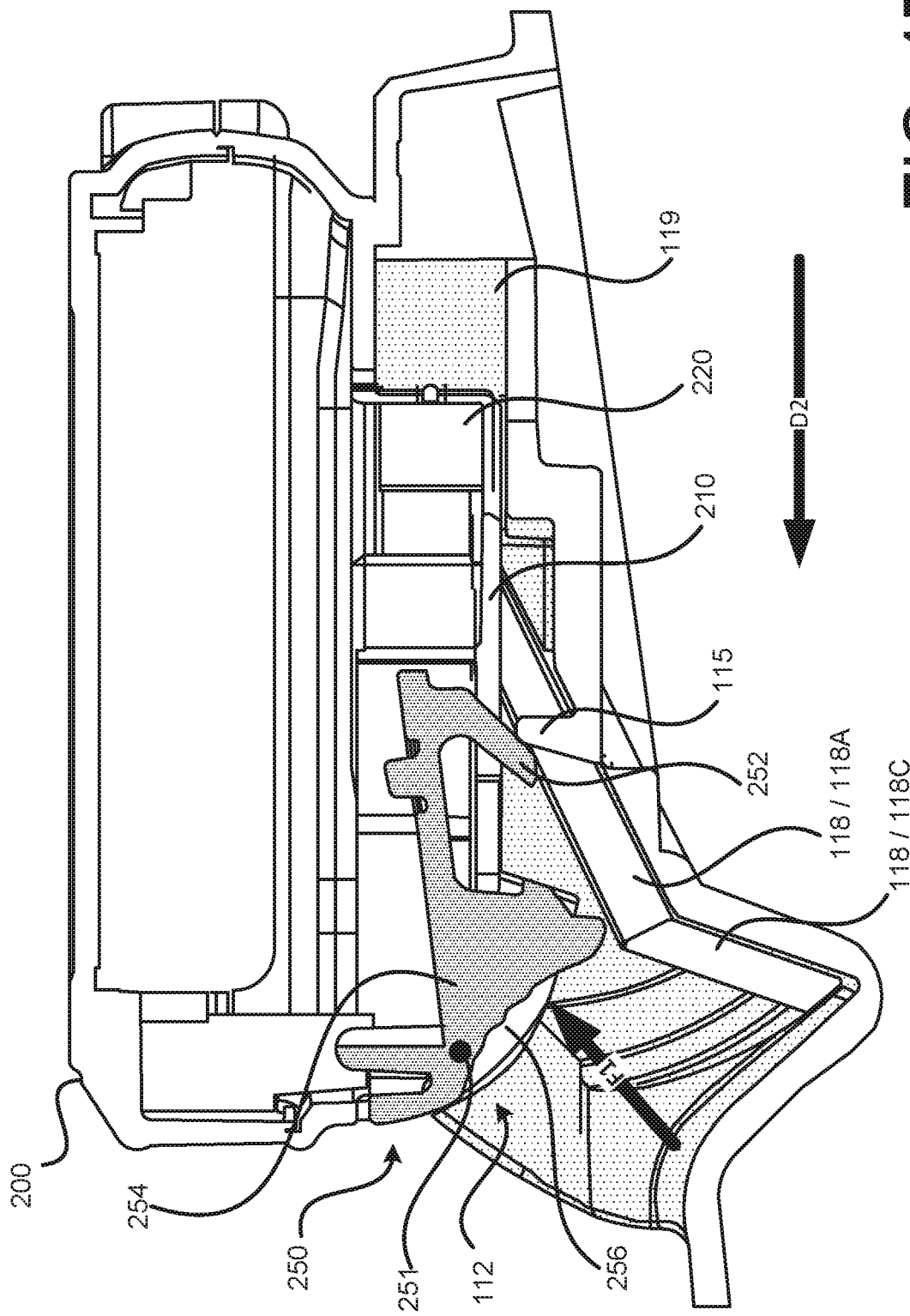

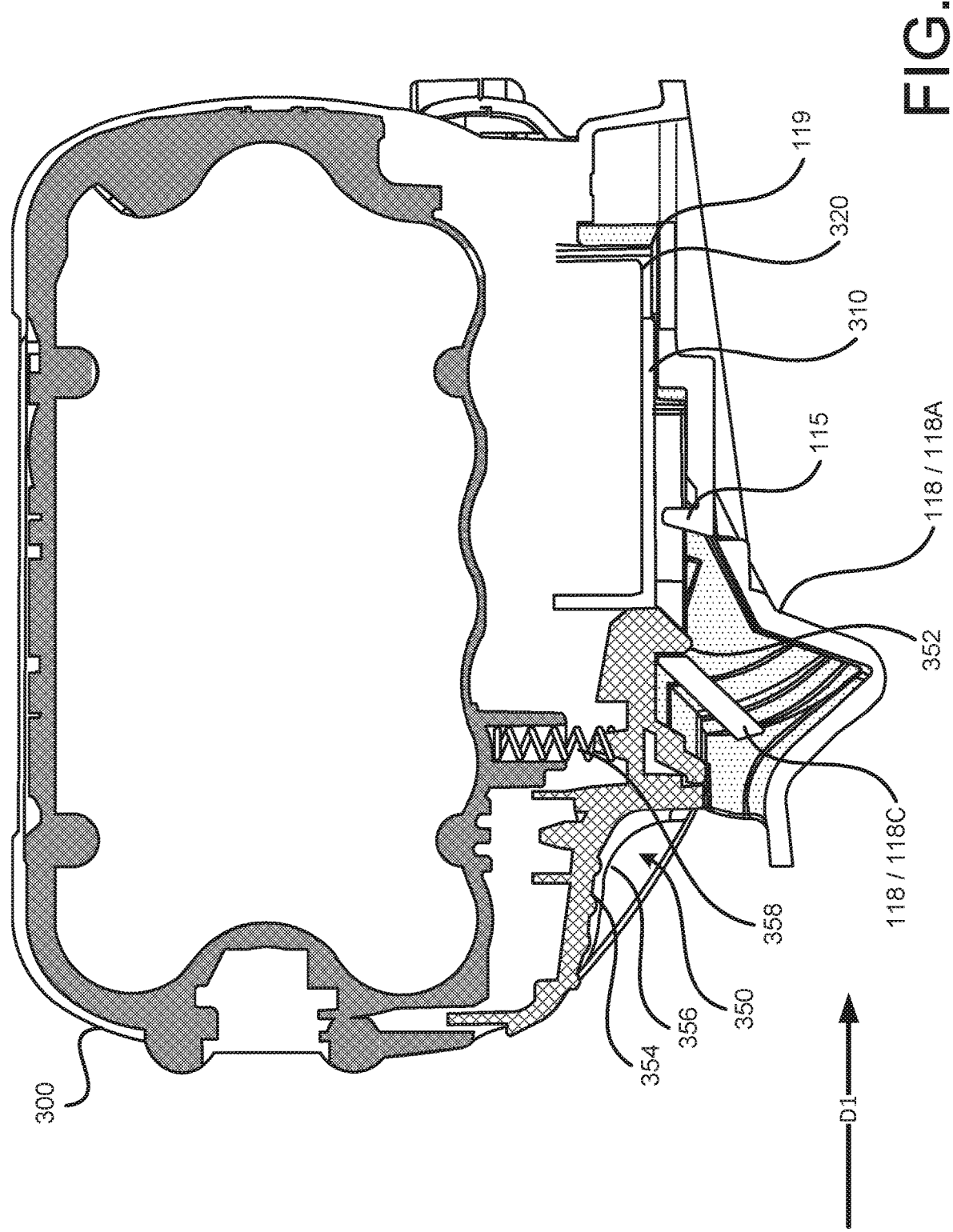

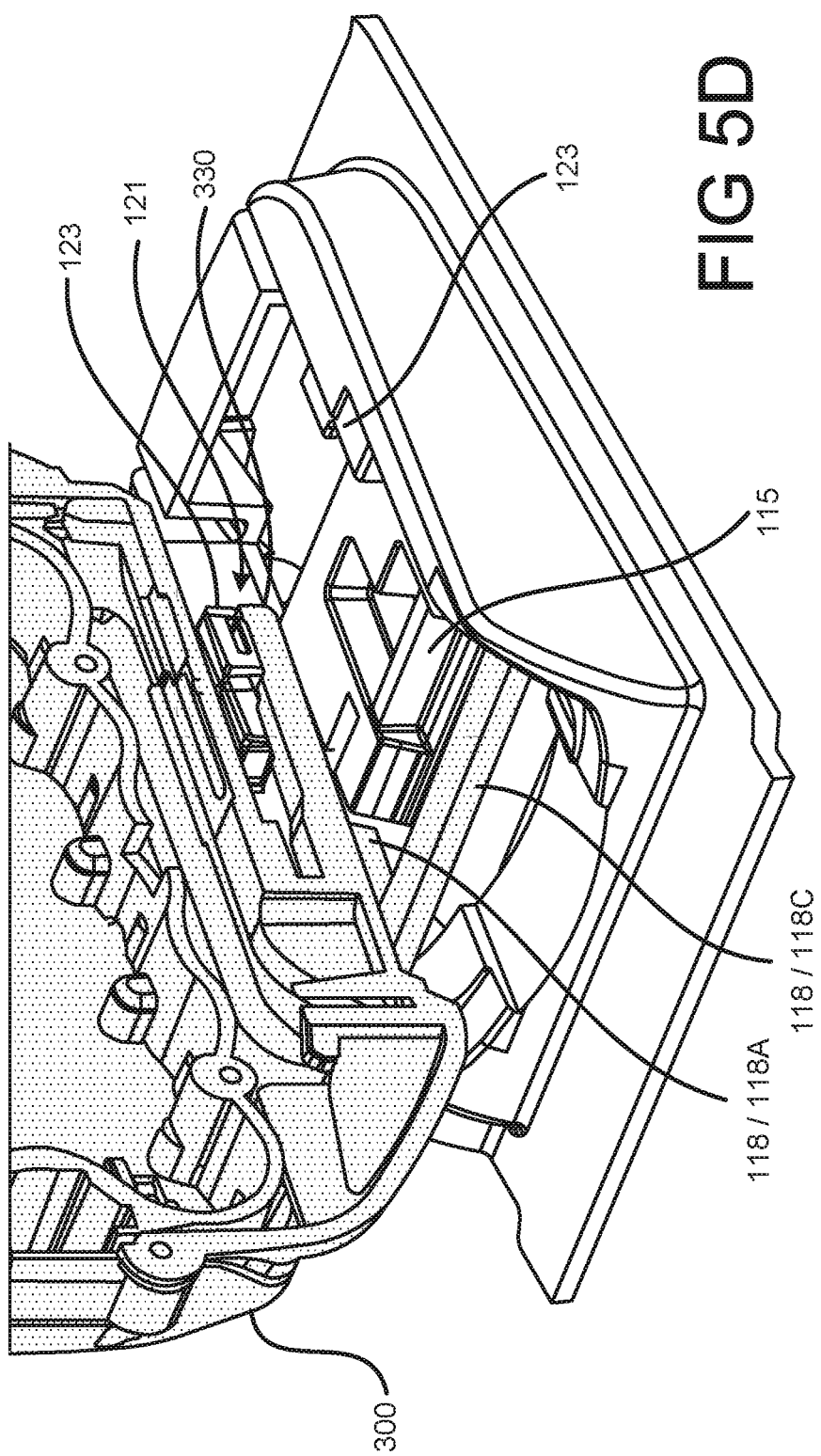

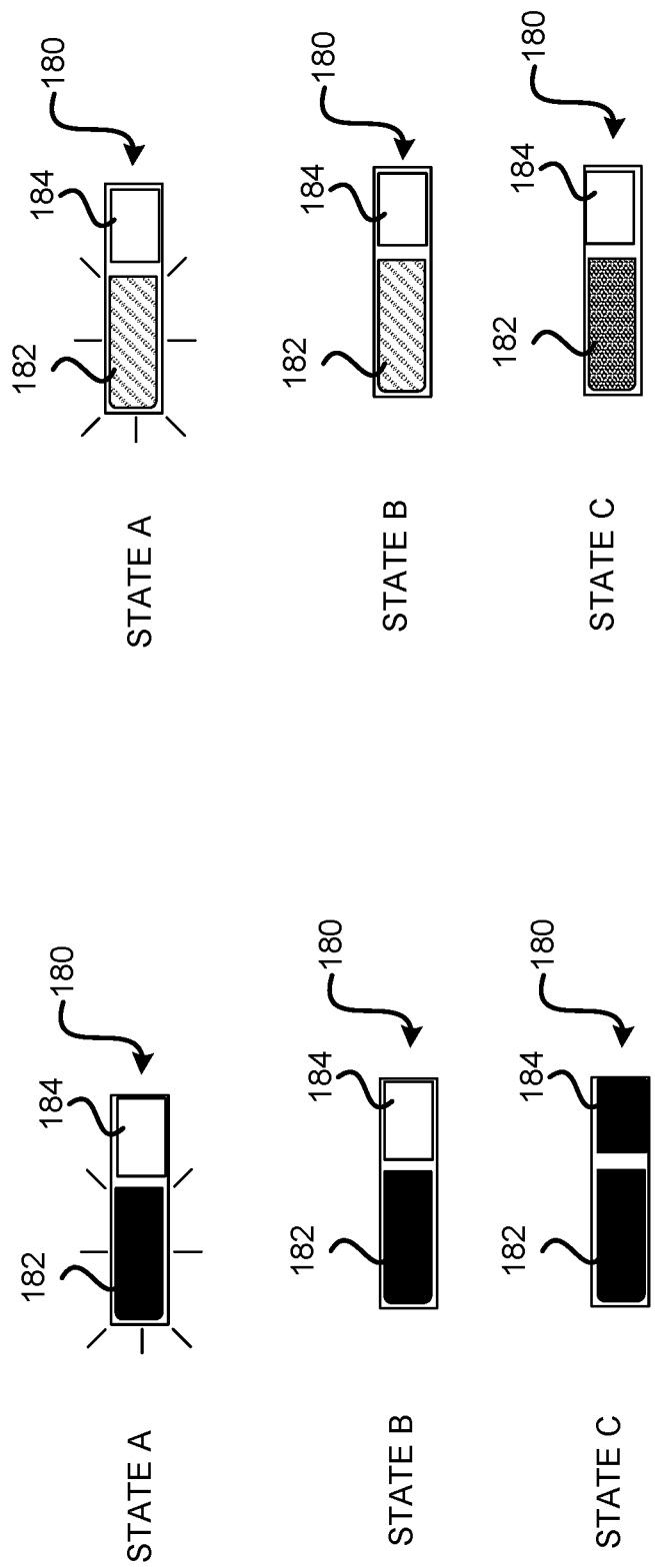

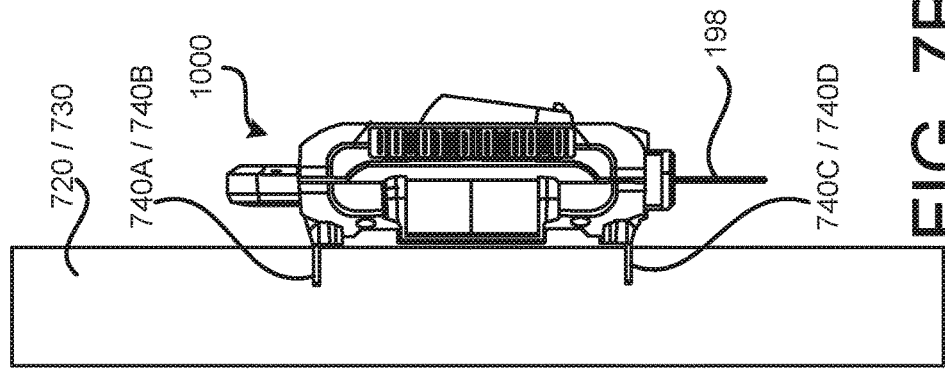
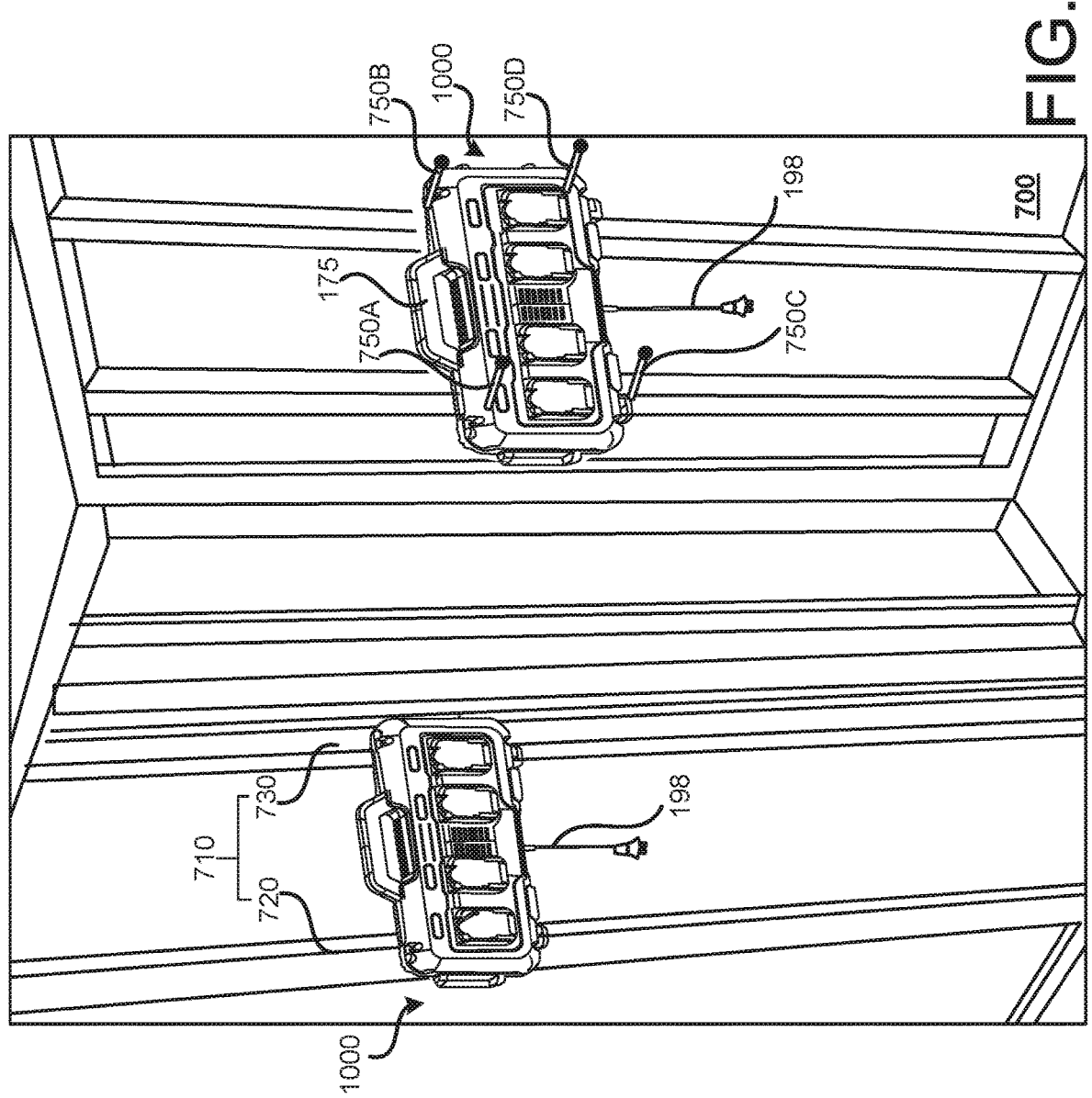

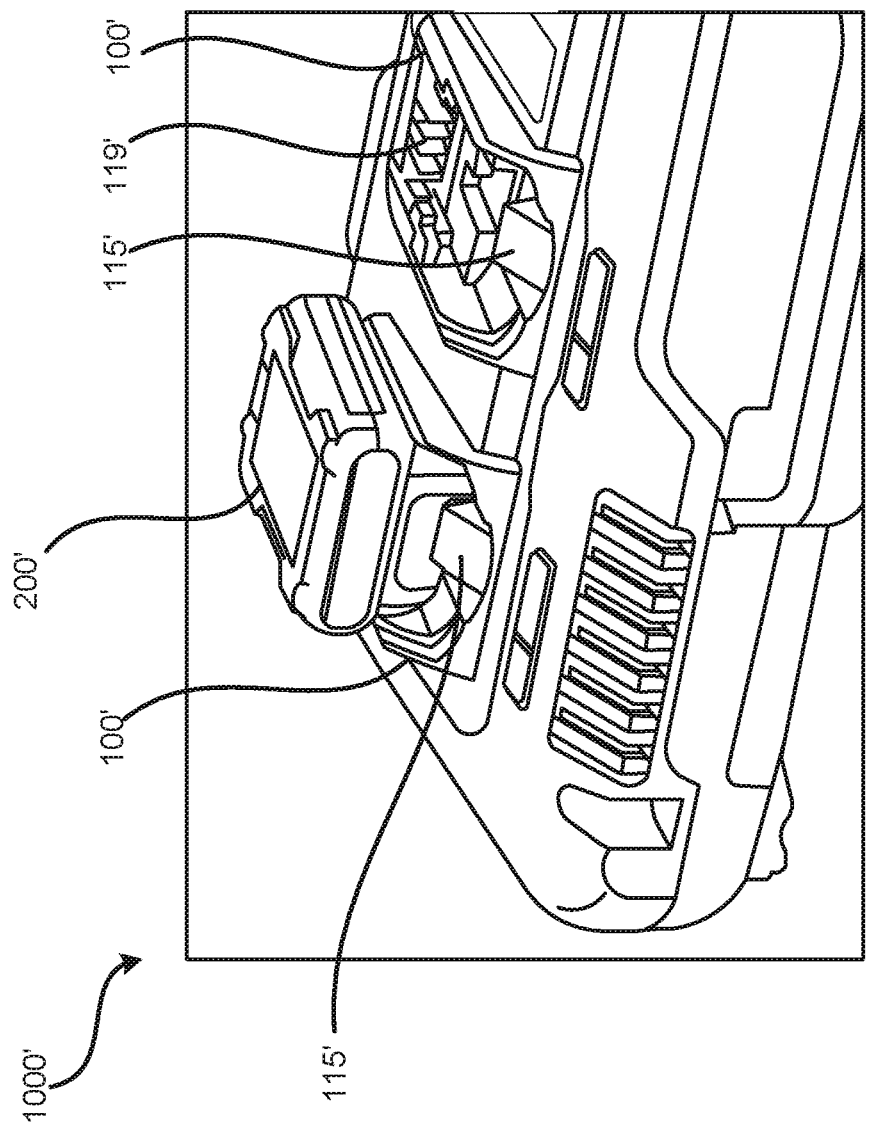

BATTERY PACK CHARGER SYSTEM

TECHNICAL FIELD

This description relates to a battery pack charger system.

BACKGROUND

Cordless power tools may be powered by portable, removable, rechargeable battery packs. In use, the battery packs powering cordless power tools may be discharged faster than the battery packs can be charged. In many environments, charging power sources (e.g., AC outlet, DC cigarette lighter outlet, etc.) are often unavailable, and/or inaccessible, and/or cannot provide enough power and energy to keep up with demand.

SUMMARY

In one general aspect, a battery charger system may include a housing; a plurality of electronic components received in the housing; and a plurality of charging ports arranged on an external portion of the housing. Each charging port of the plurality of charging ports may include a first physical feature that selectively locks a first battery pack in the charging port, the first battery pack having a first external mechanical interface; and a second physical feature that selectively locks a second battery pack in the charging port, the second battery back having a second external mechanical interface, the second external mechanical interface being different from the first external mechanical interface.

In another general aspect, a charging port of a battery charger system may include a receiving slot. The receiving slot may be defined by a first lateral wall; a second lateral wall; an end wall extending between a first end portion of the first lateral wall and a first end portion of the second lateral wall; and an opening formed between a second end portion of the first lateral wall and a second end portion of the second lateral wall. The charging port may also include a fixed latching wall fixedly positioned in the receiving slot, wherein the fixed latching wall is configured to selectively latch a first battery pack in the receiving slot, the first battery pack having a first external mechanical interface; and a rotatable latching wall rotatably positioned in the receiving slot. The rotatable latching wall may be configured to selectively latch a second battery pack in the receiving slot, the second battery pack having a second external mechanical interface, the second external mechanical interface of the second battery pack being different form the first external mechanical interface of the first battery pack.

BRIEF DESCRIPTION OF THE DRAWINGS

FIGS. 4A-4F illustrate insertion of a first removable battery pack into a charging port of a battery pack charger system, and removal of the first battery pack from the charging port of the battery pack charger system, in accordance with implementations described herein.

FIGS. 5A-5F illustrate insertion of a second removable battery pack into a charging port of a battery pack charger system, and removal of the second battery pack from the charging port of the battery pack charger system, in accordance with implementations described herein.

FIGS. 6A-6B illustrate exemplary indicators of a removable battery pack charger system, in accordance with implementations described herein.

FIGS. 7A-7D illustrate mounting of a removable battery pack charger system to a support structure, in accordance with implementations described herein.

FIGS. 9A-9F illustrate insertion and removal of removable battery packs with respect to a charging port of a battery pack charger system, in accordance with implementations described herein.

DETAILED DESCRIPTION

This document describes systems and techniques for a battery pack charger system including one or more charging ports, or receptacles, to charge one or more removable battery packs. In some implementations, each of the one or more charging ports, or receptacles, of the battery pack charger system may be capable of charging removable battery packs having, for example, different voltage ratings, and/or different external physical/mechanical configurations. In some implementations, each of the one or more charging ports, or receptacles, of the battery pack charger system may be capable of securing, or retaining, or locking these different configurations of removable battery packs into the charging port, and charging the removable battery packs, without the use of external adapters or other alteration of the charging ports to provide for connection between the battery packs and the charging ports, and securing, or retaining, or locking of the battery packs in the charging ports. In some implementations, each of the one or more charging ports, or receptacles, of the battery pack charger system may include multiple features allowing multiple different removable battery packs having multiple different mechanical interfaces to be selectively engaged in the charging port, or receptacle. For example, in some implementations, each of the one or more charging ports, or receptacles of the battery pack charger system may include a first mechanical feature that selectively engages a first mechanical interface of a first removable battery pack, and a second mechanical feature that selectively engages a second mechanical interface of a second removable battery pack, with the first mechanical interface of the first removable battery pack being different from the second mechanical interface of the second removable battery pack. For example, in some implementations, each of the one or more charging ports, or receptacles of the battery pack charger system may include a latching system, or latching mechanism, that is actuated in response to insertion of a battery pack into the charging port, or receptacle. Different portions, or features, of the latching mechanism may be actuated, depending on physical interaction between the physical features, or interface, of the battery pack with the latching mechanism.

Figure 1A:
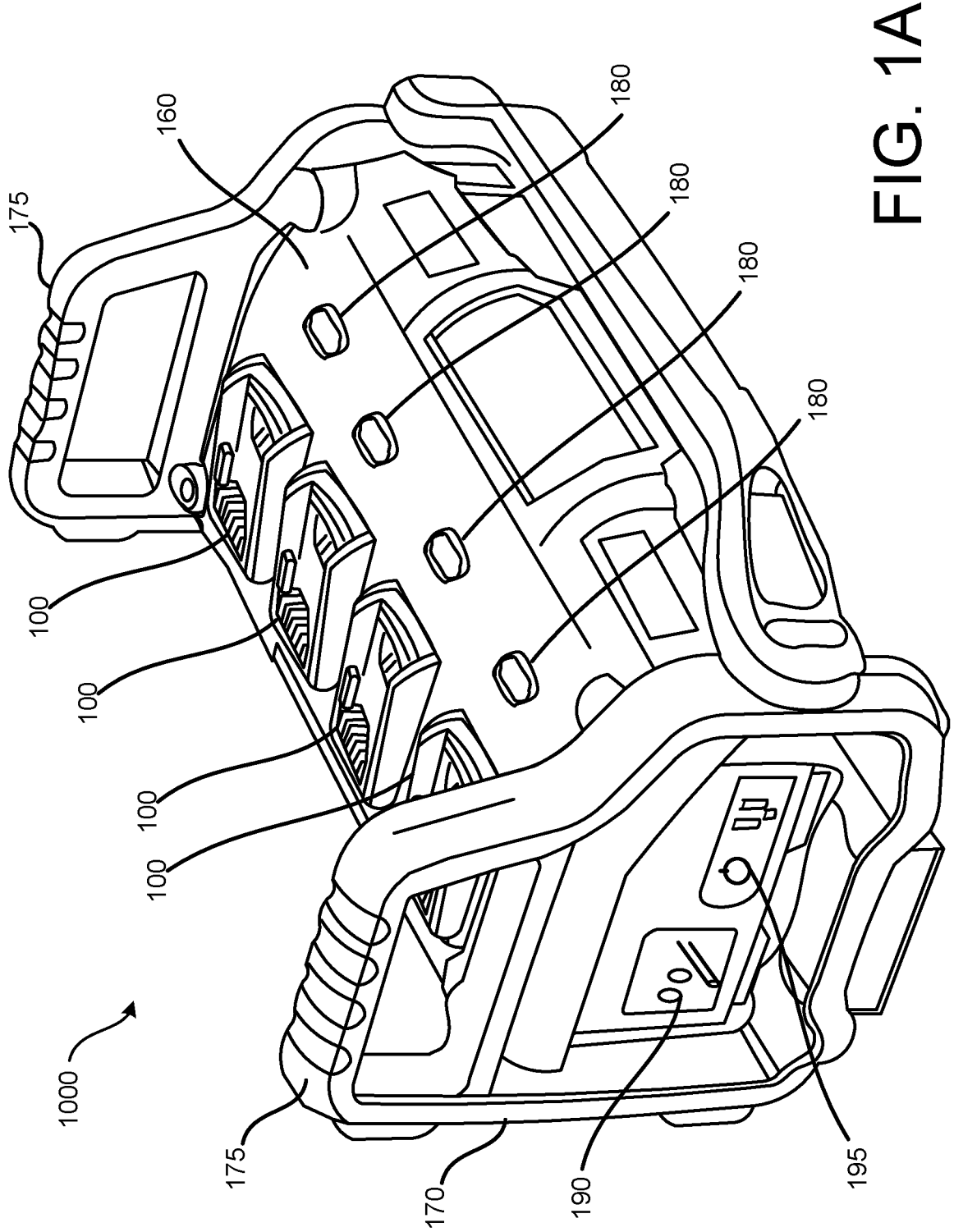
FIG. 1A is a perspective view of an exemplary battery pack charger system, in accordance with implementations described herein.

FIG. 1A is a perspective view of an exemplary battery pack charger system 1000. In the example shown in FIG. 1A, the battery pack charger system 1000 includes a housing 160 seated in a frame 170, with charging ports 100 positioned at an external portion of the housing 160. In some implementations, one or more handles 175 may facilitate transport of the charger system 1000. In some implementations, the charger system 1000 may include one or more state of charge indicators 180. Each state of charge indicator 180 may indicate a state of the charge level of a battery pack coupled in a corresponding charging port 100. In some implementations, the charger system 1000 may include external interfaces such as, for example, a first external interface (also referred to as a port or plug) 190 and a second external interface (also referred to as a port or plug) 195. Electronic components (not shown) located within the housing 160 may provide for the supply of power, for example, from an external source via one of the external interfaces 190, 195, to battery packs coupled in the charging ports 100, and/or for the supply of power from the charger system 1000 to a corded tool connected to the charger system 1000 via one of the external interfaces 190, 195. The example battery pack charger system 1000 shown in FIG. 1A includes four charging ports 100, for purposes of discussion and illustration. However, principles to be described herein may be applicable to battery pack charger systems having more, or fewer, charging ports 100, for example, in some situations as few as one charging port 100.

Figure 2A:
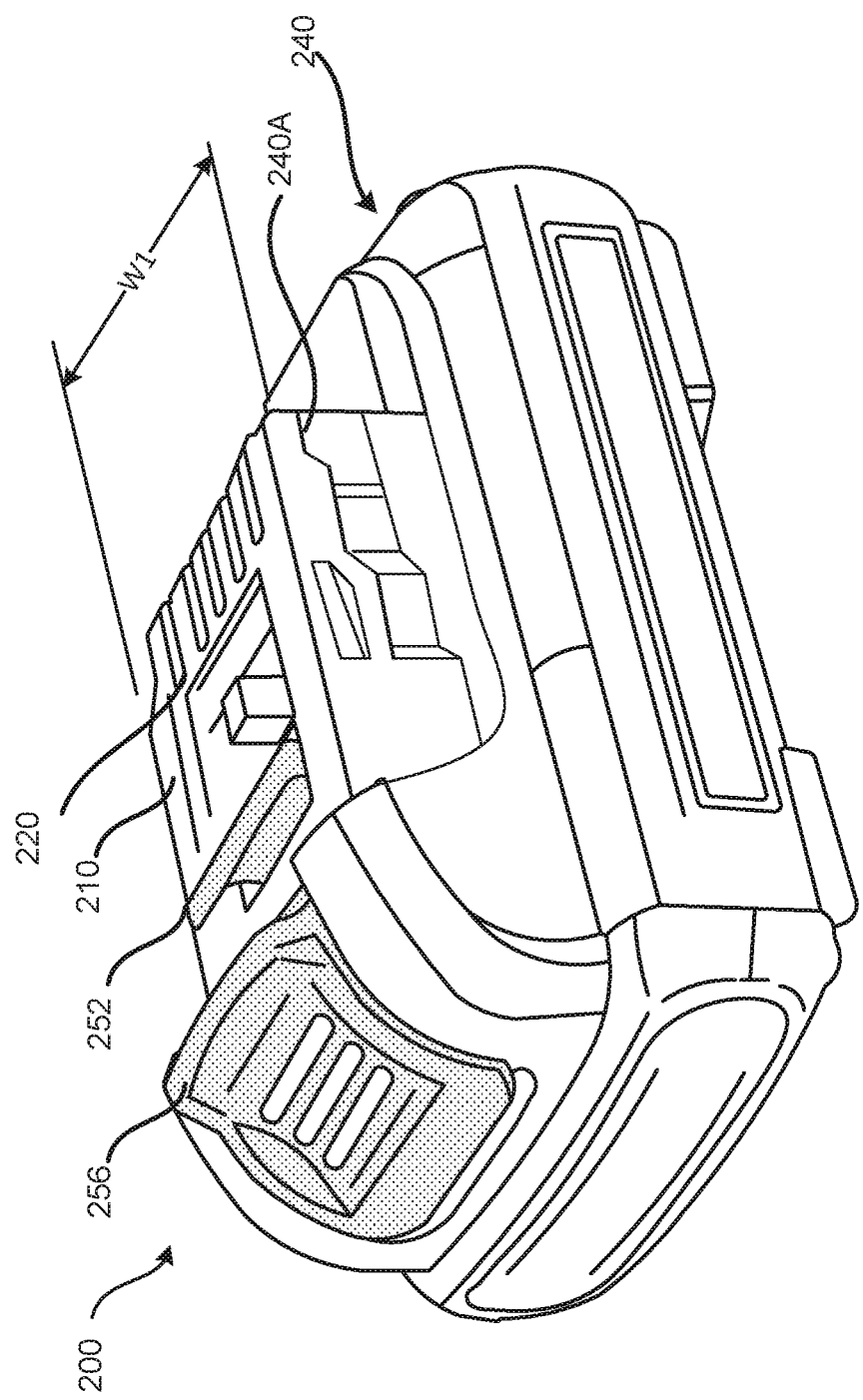
FIGS. 2A and 2B are perspective views of exemplary removable battery packs, in accordance with implementations described herein.
Figure 2B:
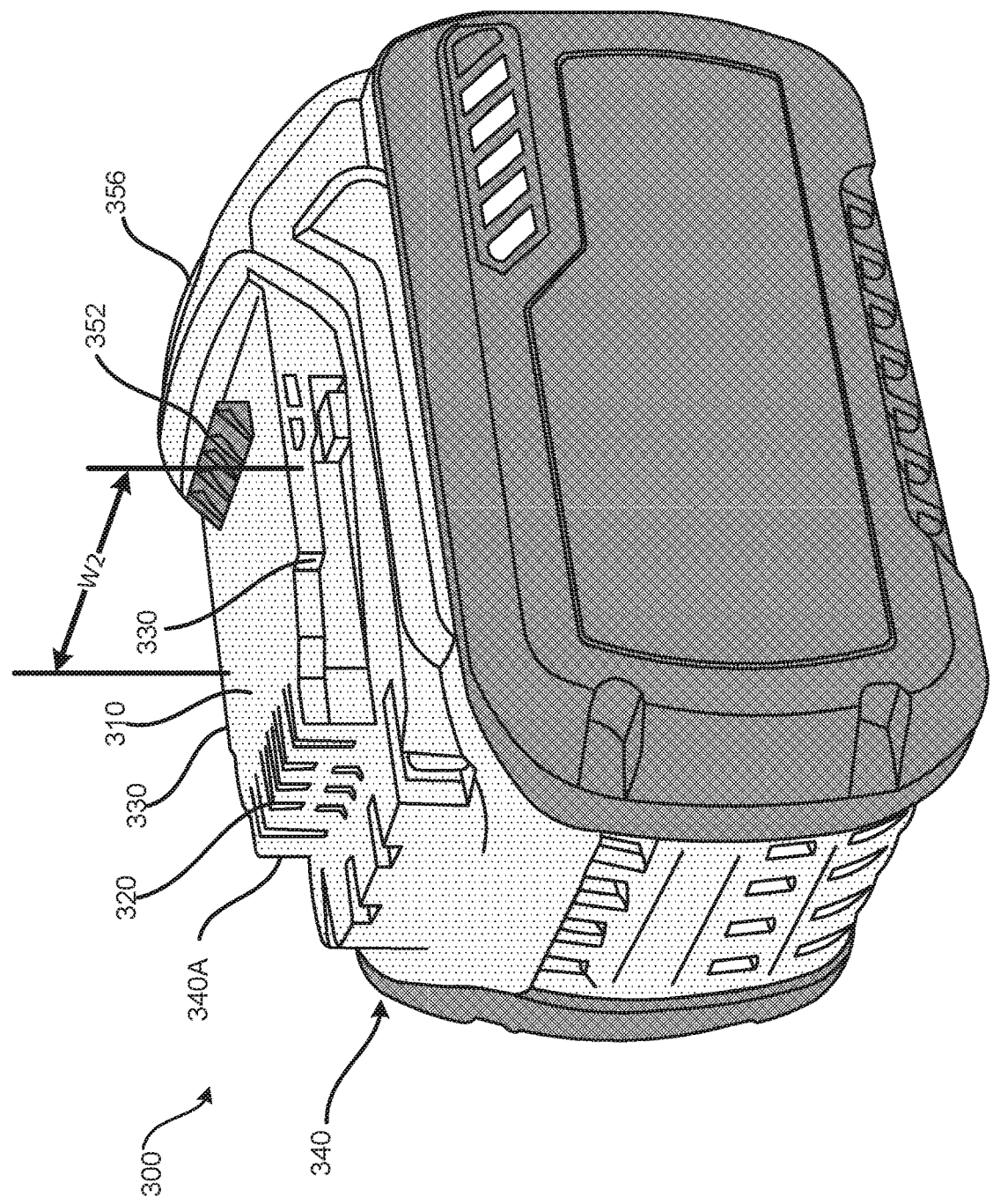

Each of the charging ports 100 may be capable of having removable battery packs, having different external physical/mechanical interfaces, movably, for example, slidably received and secured, or retained, or locked in the charging ports 100, so that the removable battery packs are not inadvertently released from the charging ports 100. A first example battery pack 200 is illustrated in FIG. 2A, and a second example battery pack 300 is illustrated in FIG. 2B.

The external physical/mechanical interface, for example, dimensions, contours and the like, of the first battery pack 200 may be different from the external physical/mechanical interface of the second battery pack 300. In some implementations, a voltage rating of the first battery pack 200 may be different from a voltage rating of the second battery pack 300. Each of the charging ports 100 of the charger system 1000, in accordance with implementations described herein, may be capable of receiving and securing both the first battery pack 200 and the second battery pack 300, regardless of the differences in external physical/mechanical interfaces between the first and second battery packs 200, 300. In some implementations, while the external physical/mechanical configuration (dimensions, contours and the like) of the first battery pack 200 and the second battery pack 300 may be different, the configuration and arrangement of the electrical connection terminals of the first battery pack 200 and the second battery pack 300 may be the same. This may allow the first battery pack 200 and the second battery pack 300 to establish an electrical connection with the charger system 1000 when received in one of the charging ports 100, regardless of the differences in external physical/mechanical interfaces between the first and second battery packs 200, 300.

Figure 1B:
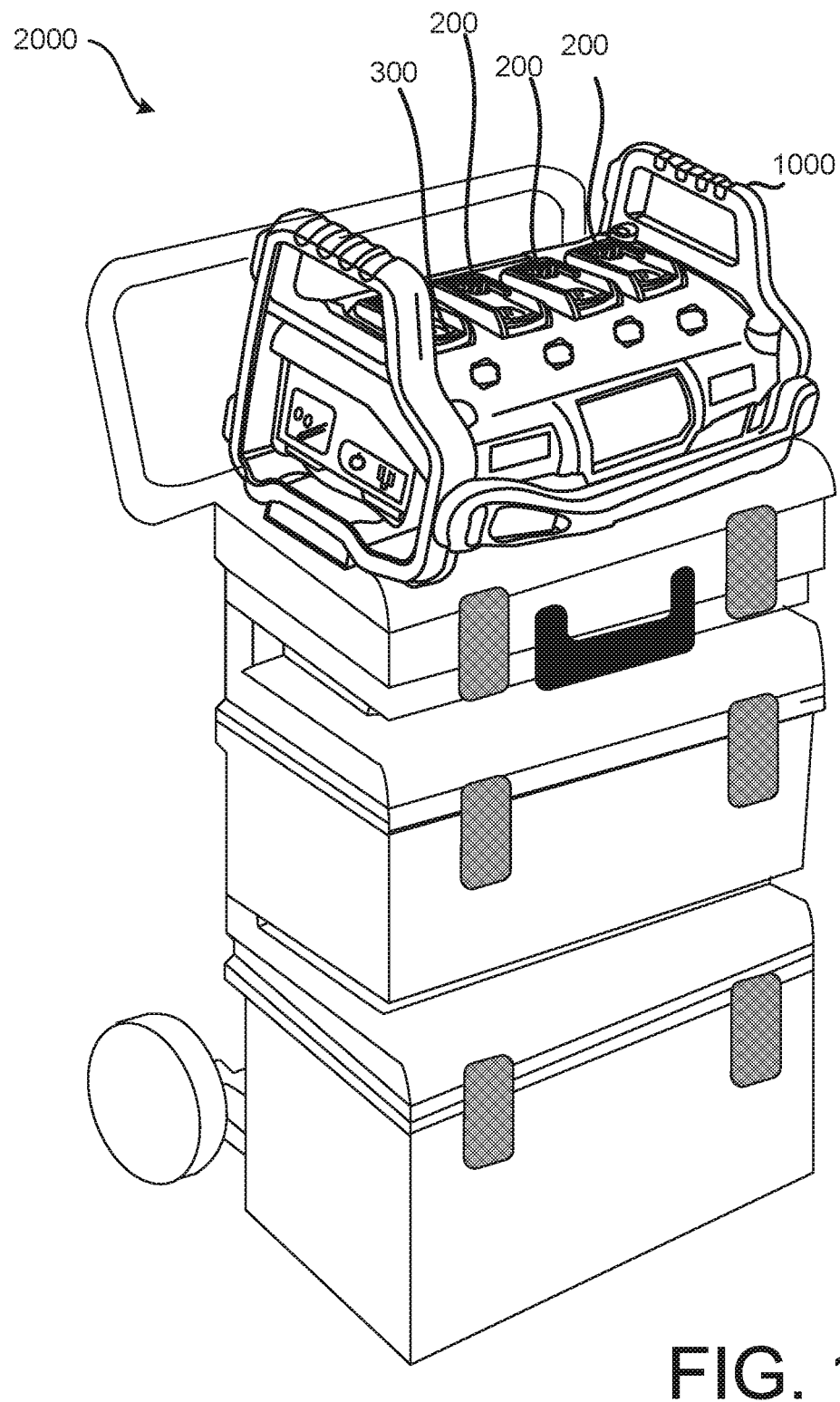
FIG. 1B is a perspective view of the exemplary battery pack charger system shown in FIG. 1A with a exemplary transport and/or storage system, in accordance with implementations described herein.

FIG. 1B illustrates the charger system 1000 mounted on, or coupled to, an exemplary transport and/or storage system 2000. The coupling of the charger system 1000 to a transport and/or storage system 2000 as illustrated in FIG. 1B may facilitate transport of the charger system 1000 to a variety of different locations, or work sites, and/or facilitate relocation within a current work site. This may allow the charger system 1000 to quickly and easily provide a mobile power source to, for example, corded tools via one of the external interfaces 190, 195, as well as providing for the transport and localized charging of multiple combinations of removable battery packs 200, 300.

In a charger system 1000, in accordance with implementations described herein, multiple different removable battery pack configurations may be received and secured in the charging ports 100 for charging. This may provide a flexible, convenient alternative for charging multiple different removable battery packs, on site, thus enhancing utility and functionality of the charger system 1000, and of the various tools/tool systems using the removable battery packs.

Figure 3A:
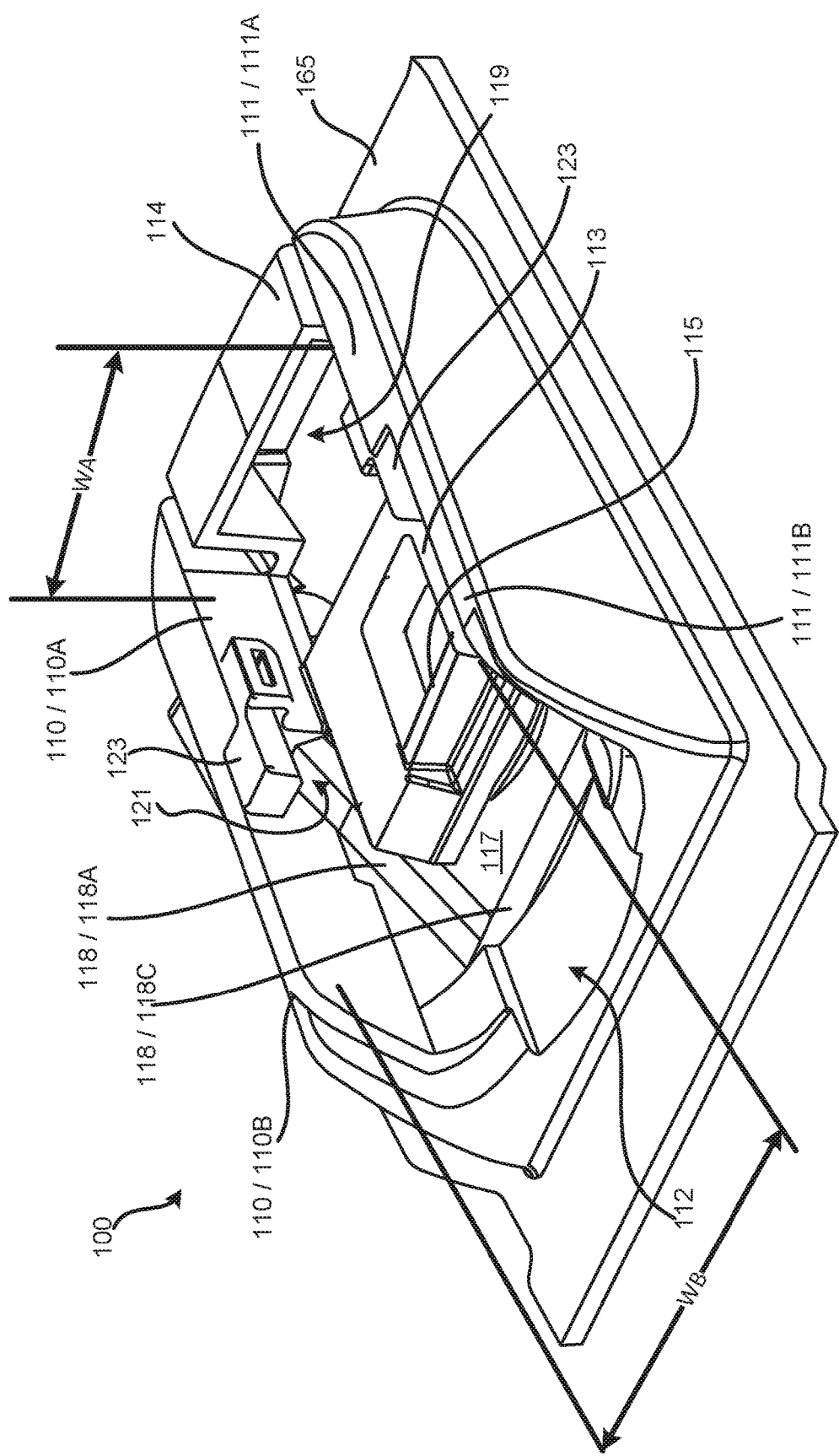
FIG. 3A is a perspective view.
Figure 3B:
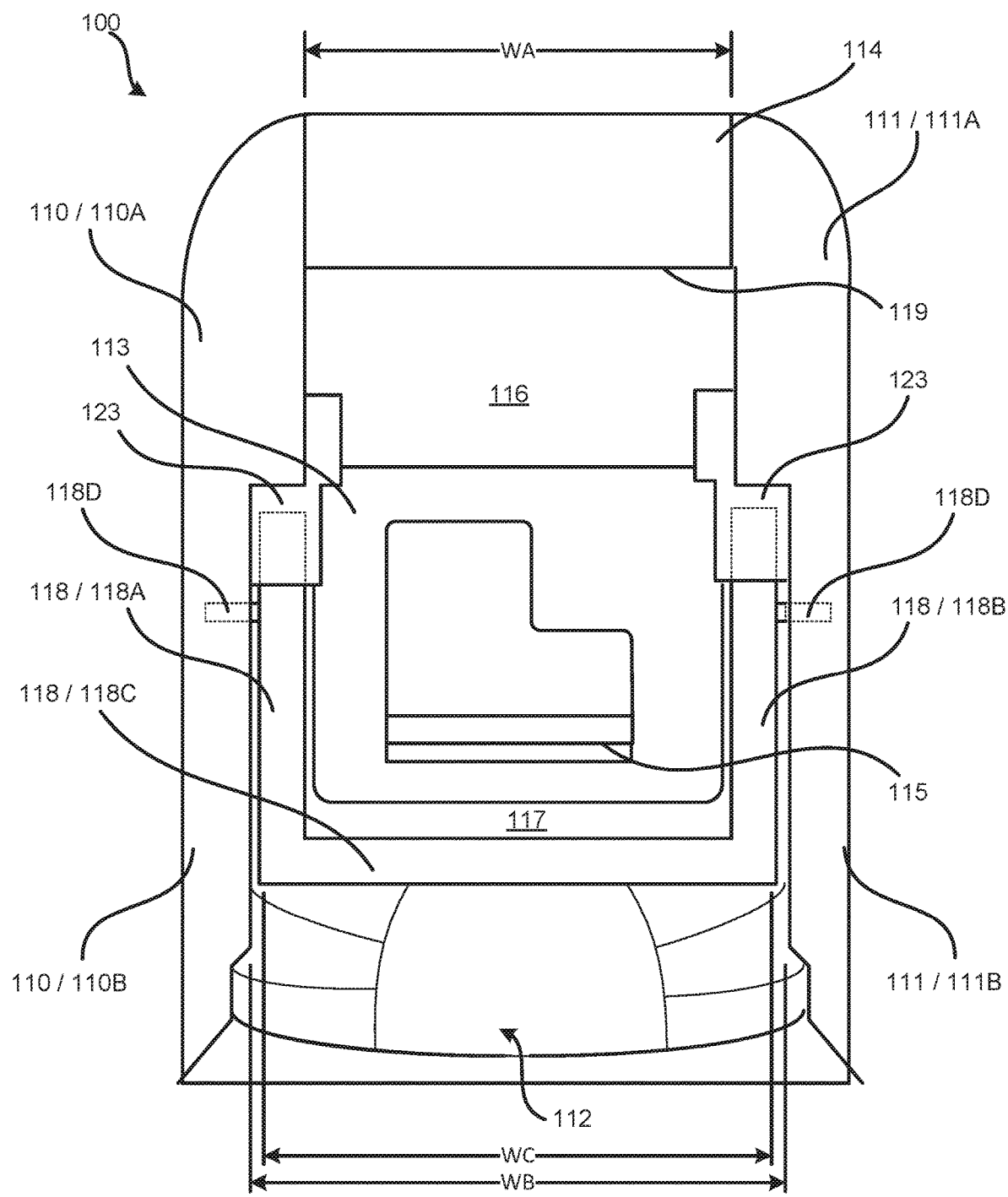
FIG. 3B is a top view, of an exemplary charging port of a battery pack charger system, in accordance with implementations described herein.

FIG. 3A is a perspective view, and FIG. 3B is a top view, of one of the charging ports 100 of the example charger system 1000 shown in FIG. 1A. As shown in FIGS. 3A and 3B, the charging port 100 may be located on an external portion 165 of the housing 160, for example, a top portion 165 of the housing 160. A first lateral wall 110 and a second lateral wall 111 may protrude upward, from the top portion 165 of the housing 160. A terminal end wall 114 may extend between a first end portion 110A of the first lateral wall 110 and a first end portion 111A of the second lateral wall 111. An opening 112 may be defined between a second end portion 110B of the first lateral wall 110 and a second end portion 111B of the second lateral wall 111. The first and second lateral walls 110, 111 and the end wall 114 may define a receiving slot 116 of the charging port 100. A removable battery pack, such as, for example, one of the exemplary battery packs 200, 300 illustrated in FIGS. 2A and 2B, may slide into and out of the receiving slot 116 of the charging port 100 through the opening 112 between the first and second lateral walls 110, 111.

The charging port 100, and in particular, the receiving slot 116, may be configured to receive, or accommodate, and secure, multiple different removable battery packs therein, such as, for example, the exemplary battery packs 200, 300 illustrated in FIGS. 2A and 2B. In particular, a physical configuration of charging port 100, for example, dimensions, geometry, contours and the like, of the charging port 100 may allow different removable battery packs, such as, for example, the battery packs 200, 300 to be securely coupled in the charging port 100, with an electrical connection between the removable battery pack and the charging port 100/charger system 1000 providing for charging of the removable battery pack coupled in the charging port 100.

For example, in some implementations, a first width WA may be defined between opposite inner surfaces of the respective first end portions 110A, 111A of the first and second lateral walls 110, 111 of the charging port 100. A second width WB may be defined between opposite inner surfaces of the respective second end portions 110B, 111B of the first and second lateral walls 110, 111 of the charging port 100. A fixed latching wall 115 may be formed in the receiving slot 116. The fixed latching wall 115 may extend upward into the receiving slot 116, from a lower, or bottom portion of the receiving slot 116. In the example shown in FIGS. 3A and 3B, the latching wall 115 is formed in a protrusion 113 in a central portion of the receiving slot 116, between the first and second lateral walls 110, 111. In some implementations, the latching wall 115 may be substantially perpendicular to the first and second lateral walls 110, 111. A locking bar 118 may be pivotably, or rotatably, coupled to the protrusion 113. A terminal connection interface 119 may provide for electrical connection between the charger system 1000 and a removable battery pack positioned in the charging port 100, and in particular, for electrical connection with a corresponding terminal connection interface of the removable battery pack.

In the example shown in FIGS. 3A and 3B, the locking bar 118 includes a first actuation member (also referred to as an actuation arm) 118A, a second actuation member (also referred to as an actuation arm) 118B, and a cross member (also referred to as a locking arm) 118C, extending between the first and second actuation members 118A, 118B. In some implementations, a shaft 118D may extend from the first actuation member into a corresponding slot in the first lateral wall 110, and a shaft 118D may extend from the second actuation member 118B into a corresponding slot in the second lateral wall 111, to rotatably couple the locking bar 118 in the receiving slot 116. In some implementations, the shafts 118D may extend from each of the first and second actuation members 118A, 118B into corresponding slots formed in the protrusion 113. The shafts 118D may be fixedly coupled to the first and second actuation members 118A, 118B, and rotatably received in the corresponding slots, such that the locking bar 118 may selectively pivot, or rotate, about the shafts 118D. As shown in FIG. 3A, a distal end portion of each of the actuation members 118A, 118B may be positioned in a cavity 121 defined by the inner surface of the respective lateral wall 110, 111, a corresponding portion of the protrusion 113, and a corresponding top wall portion 123. In FIG. 3A, the locking bar 118 is illustrated in an at rest (not engaged) position, with the cross member 118C positioned in a recess 117 adjacent to the protrusion 113, and the distal end portions of the actuation members 118A, 118B extending away from an internal space of the battery charger system, at an angle, from the cross member 118C.

Figure 4A:
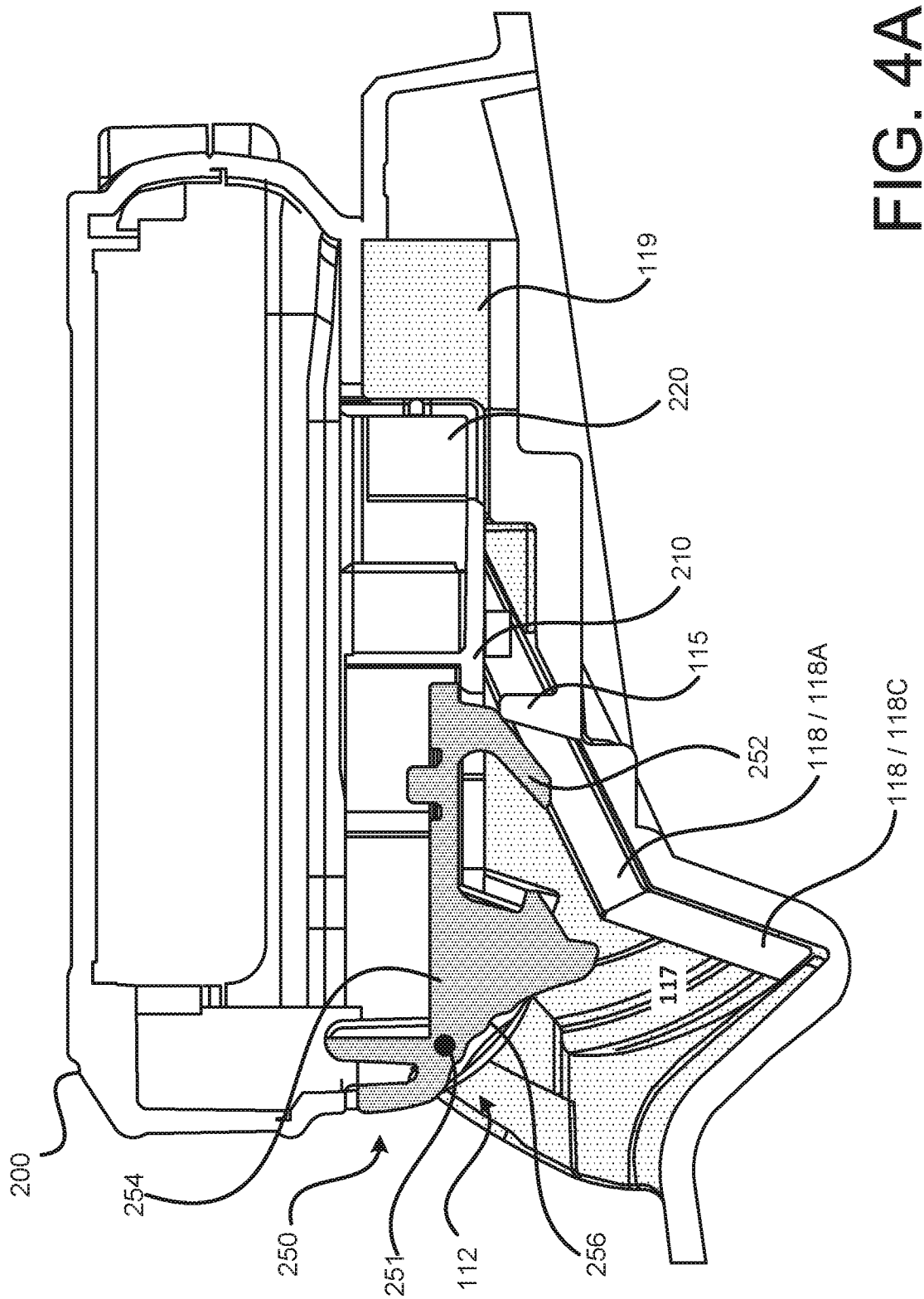
Figure 4B:
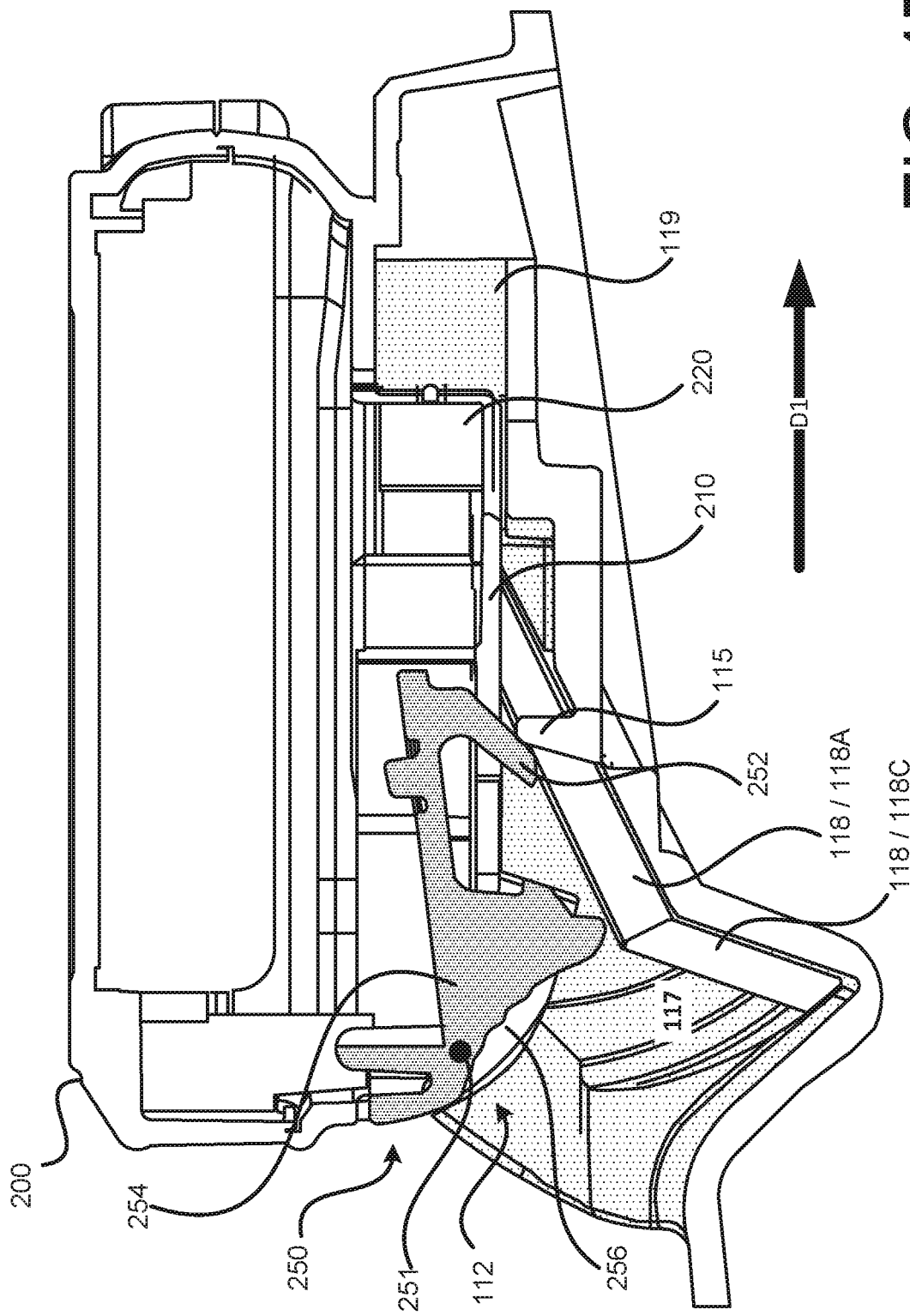
Figure 4C:
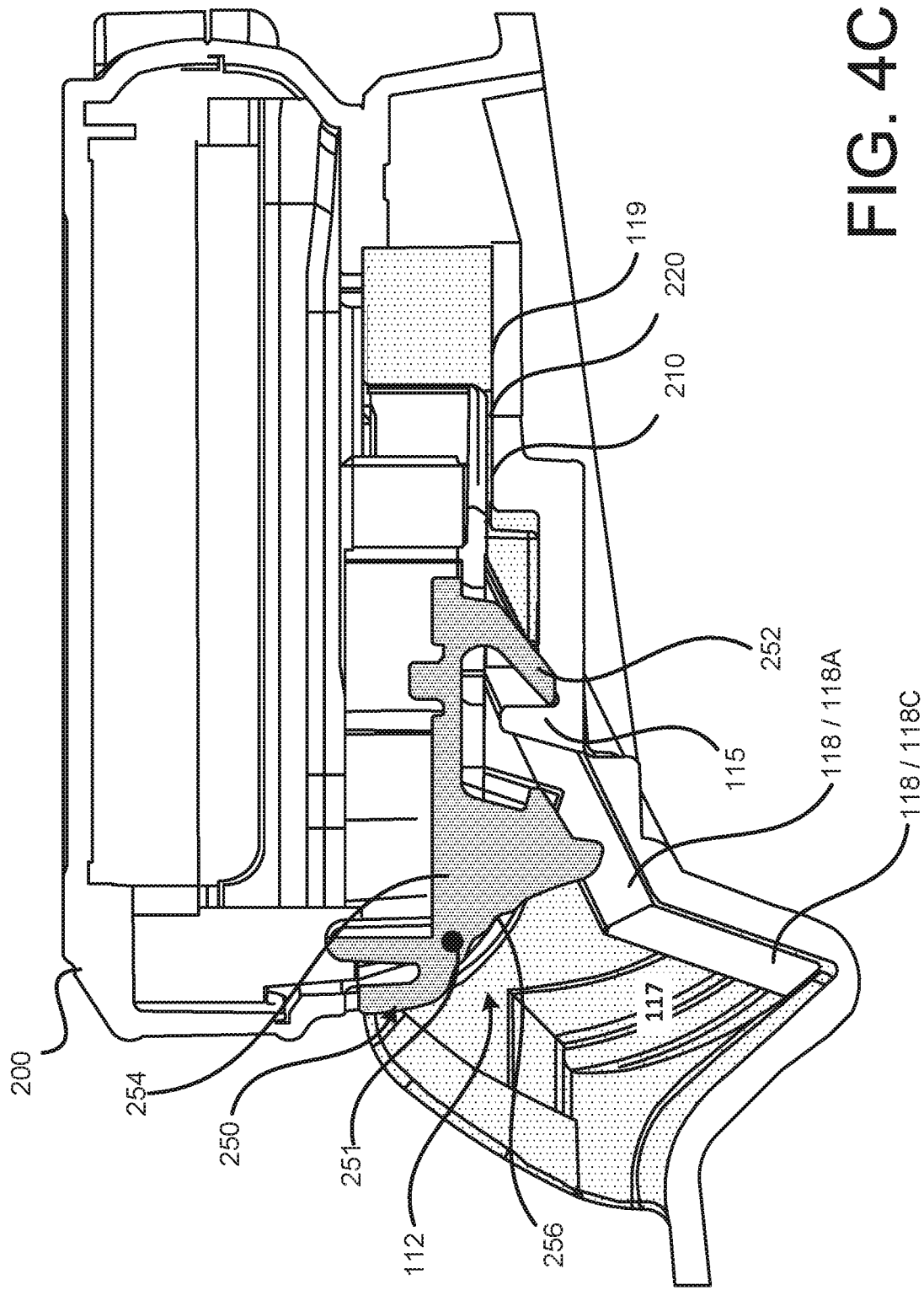
Figure 4D:
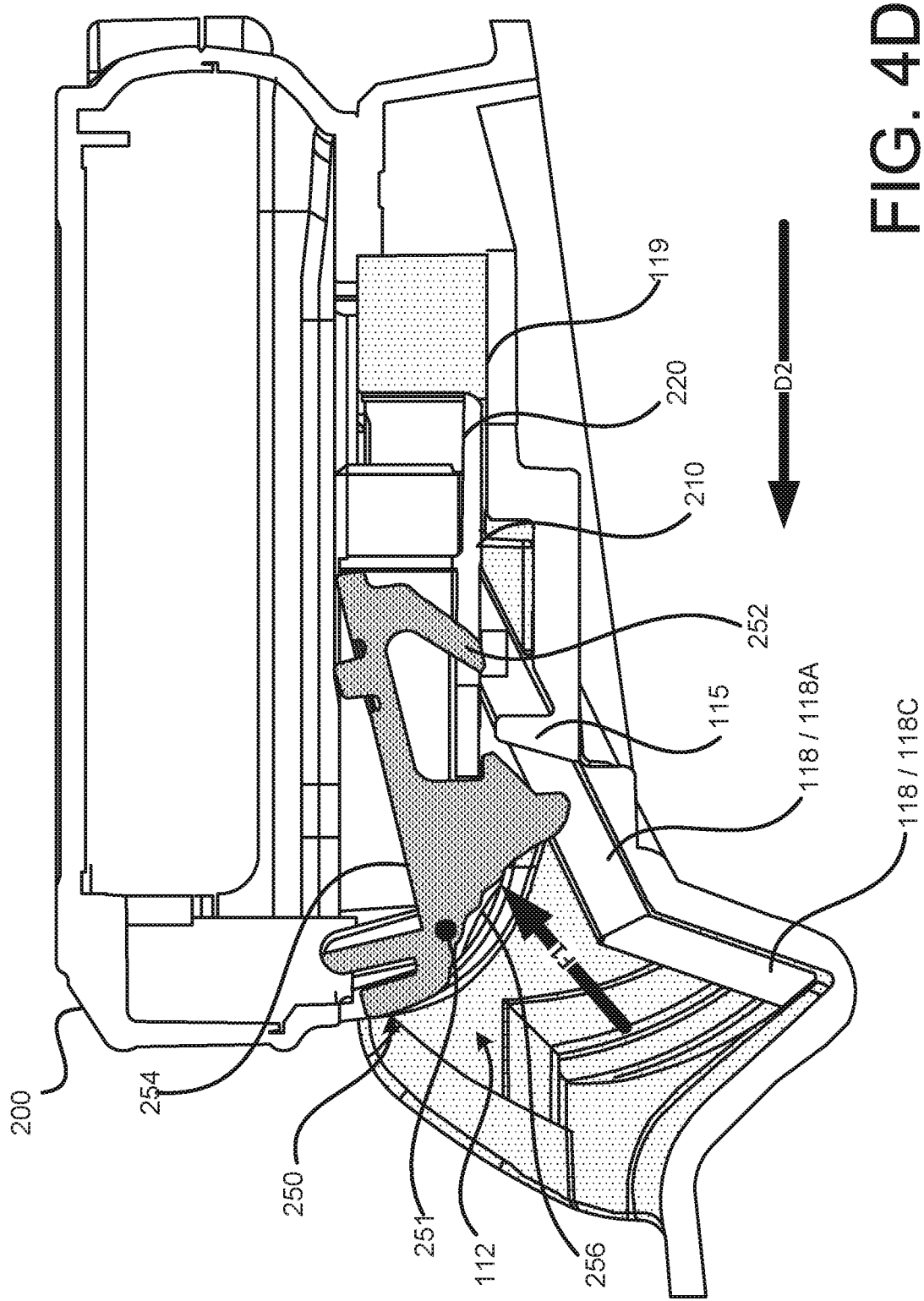
Figure 4F:
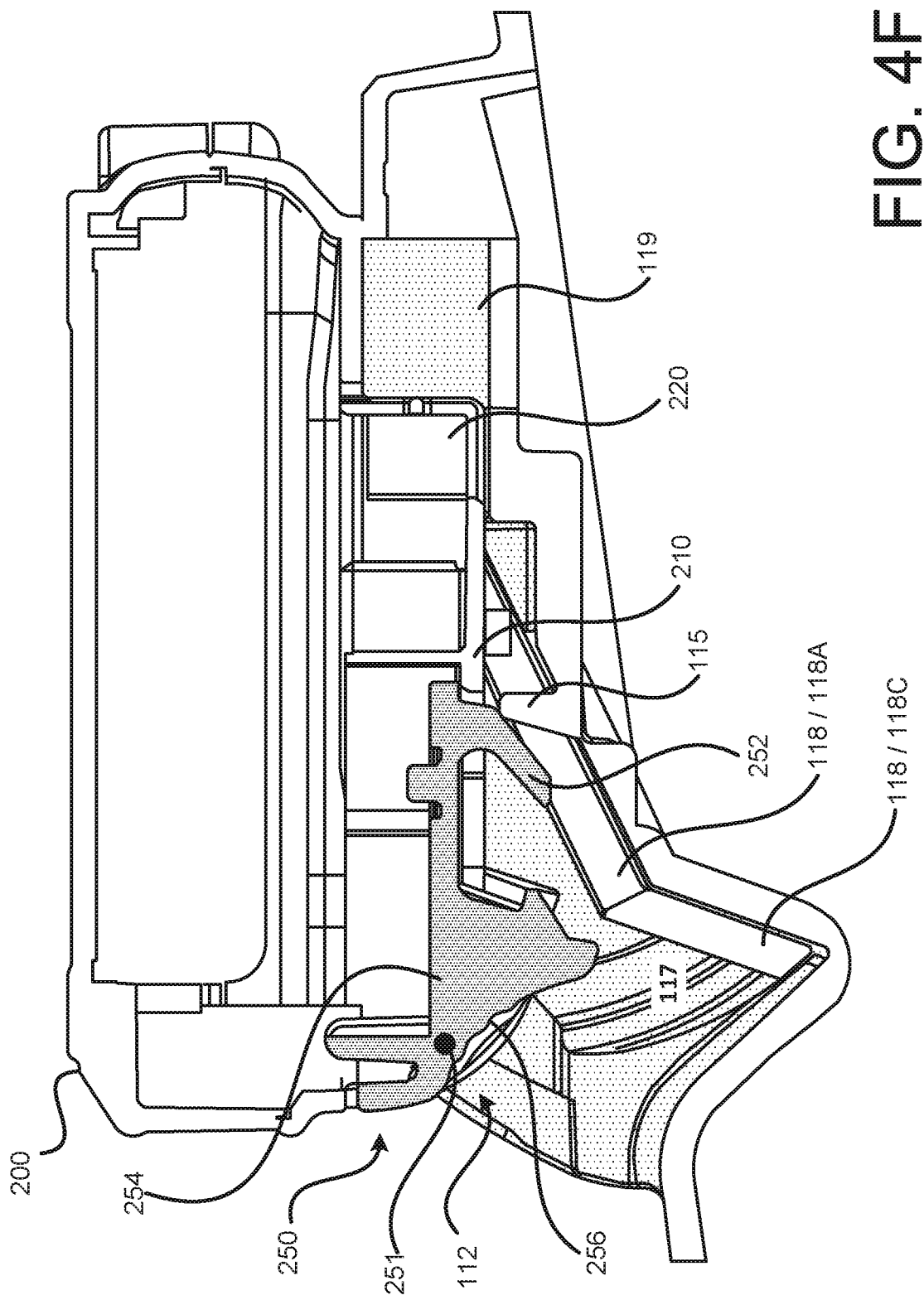

FIGS. 4A-4F illustrate the releasable coupling of a first removable battery pack, such as, for example, the exemplary battery pack 200 shown in FIG. 2A, into the receiving slot 116 of the charging port 100, in accordance with implementations described herein. In particular, FIGS. 4A-4C are cross sectional views illustrating the sequential insertion of the removable battery pack 200 into the charging port 100 and securing, or locking of the battery pack 200 into the charging port 100. FIGS. 4D-4F are cross sectional views illustrating the disengagement and sequential removal of the removable battery pack 200 from the charging port 100.

As shown in FIGS. 4A-4F, the battery pack 200 may be inserted and secured in, or latched in, the charging port 100 with a mating surface 210 of an insertion portion 240A of the battery pack 200 facing the charging port 100 (i.e., upside-down when taken in the context of the orientation of the battery pack 200 illustrated in FIG. 2A relative to the example illustrated in FIGS. 4A-4F). Insertion of the battery pack 200 into the charging port 100 in this orientation will allow a terminal connection interface 220 of the battery pack 200 to connect with the terminal connection interface 119 of the charging port 100, and for the battery pack 200 to be securely coupled in, or retained in, or locked in the charging port 100, when the battery pack 200 is in the fully inserted, latched position shown in FIG. 4C.

In some implementations, a latching mechanism 250 of the battery pack 200 may releasably engage the latching wall 115 located in the receiving slot 116 of the charging port 100 to latch the battery pack 200 into the charging port 100. The latching mechanism 250 may be rotatably, or pivotably, coupled to a body portion 240 of the battery pack 200. As shown in FIG. 4A, the battery pack 200 may be inserted, for example, slidably inserted, into the charging port 100 through the opening 112. At the point of insertion of the battery pack 200 into the charging port 100 illustrated in FIG. 4A, the latching mechanism 250 is in an un-rotated, or at rest position. As the battery pack 200 is moved into the receiving slot 116 of the charging port 100, for example, in a direction D1, a latching portion (also referred to as an engagement portion, or a catch) 252, formed at a first end portion of a body 254 of the latching mechanism 250, contacts, or abuts, the latching wall 115, causing the latching mechanism 250 to rotate about a pivot 251, as shown in FIG. 4B (i.e., counter-clockwise, in the orientation shown in FIG. 4B). Continued movement of the battery pack 200 into the receiving slot 116 of the charging port 100 (for example, in the direction D1) and continued contact of the latching portion 252 with the latching wall 115, causes the latching portion 252 to move beyond the latching wall 115, and to be latched, or caught behind the latching wall 115, as shown in FIG. 4C. This allows the latching mechanism 250 to rotate back (i.e., clockwise, in the orientation shown in FIG. 4C) into the un-rotated position, with the latching portion 252 of the latching mechanism 250 caught by, or latched by, or retained by, or engaged with, the latching wall 115.

The engagement of the latching portion 252 of the latching mechanism 250 of the battery pack 200 with the latching wall 115 of the charging port 100 of the charger system 1000 secures, or retains, or locks the battery pack 200 in the charging port 100. In particular, the securing of the battery pack 200 in the charging port 100 through the engagement of the latching portion 252 of the latching mechanism 250 with the latching wall 115 of the charging port 100 may ensure the battery pack 200 is securely coupled in, or retained in, the charging port 100. This may ensure that the battery pack 200 is not inadvertently released from the charging port 100 for example, during movement and/or transport of the charger system 1000, when the charger system 1000 is oriented or otherwise installed in an orientation (such as, for example, a vertical orientation) that may cause inadvertent release of the battery pack 200 from the charger system 1000, and the like. In the secured, or retained, or locked position shown in FIG. 4D, an electrical connection may be established between the terminal connection interface 220 of the battery pack 200 and the terminal connection interface 119 of the charging port 100, to allow for charging of the battery pack 200. The engagement of the latching portion 252 of the latching mechanism 250 and the latching wall 115 of the charging port 100 in this manner may also help to maintain the electrical connection between terminal connection interface 119 of the charging port 100 and the terminal connection interface 220 of the battery pack 200.

The user may wish to remove the battery pack 200 from the charging port 100, for example, at the completion of a charging cycle, and/or to install the battery pack 200 in a tool for use, and/or to allow for charging of another battery pack in the charging port 100, and the like. From the engaged position shown in FIG. 4D, the user may apply a force F1 to a release button (also referred to as a release surface) 256, formed at a second end portion of the body 254 of the latching mechanism 250. The force F1 applied at the release button 256 may cause the latching mechanism 250 to rotate about the pivot 251, for example, to the position shown in FIG. 4E, disengaging the latching portion 252 from the latching wall 115. Continued application of the force F1 may maintain the latching mechanism 250 in this rotated position, disengaged from the latching wall 115, so that as the user moves the battery pack 200 out of the charging port 100, for example, in the direction D2, the latching portion 252 is moved past the latching wall 115 and the battery pack 200 can be removed from the charging port 100.

As shown in FIG. 2A, an insertion portion 240A of the body 240 of the battery pack 200 that is inserted into the charging port 100, as described above, may have a dimension, for example, a width W1. The width W1 of the insertion portion 240A of the battery pack 200 may allow the insertion portion 240A of the battery pack 200 to fit between the inner surface of the first end portion 110A of the first lateral wall 110 and the inner surface of the first end portion 111A of the second lateral wall 111 when the battery pack 200 is inserted into the charging port 100. For example, the width W1 of the insertion portion 240A of the battery pack 200 may be approximately equal to, or less, for example, only slightly less, than the width WA of the charging port 100 between the first end portions 110A, 111A of the first and second lateral walls 110, 111. In this manner, the portions of the first and second lateral walls 110, 111 at the terminal end of the receiving slot 116 may form a guide for the insertion of the first battery pack 200 into the charging port 100.

In this example arrangement, the width W1 of the insertion portion 240A of the battery pack 200 is less, for example, slightly less, than the width WB defined between inner surfaces of the respective second end portions 110B, 111B of the first and second lateral walls 110, 111 of the charging port 100. As shown in FIGS. 4A-4F, the width W1 of the insertion portion 240A of the battery pack 200 is also less than a distance WC between the first actuation member 118A and the second actuation member 118B. Thus, as the battery pack 200 is inserted into/removed from the charging port 100, the insertion portion 240A remains in the space between the first and second actuation members 118A, 118B (i.e., within the space defined by the distance, or width WC), and there is no contact, or interaction, between the battery pack 200 and the locking bar 118. As the battery pack 200 is inserted into the charging port 100, the movement of the battery pack 200 is guided by, and limited by, the movement of the insertion portion 240A into the space between the respective first end portions 110A, 111A of the first and second lateral walls 110, 111, and the battery pack 200 remains within the space (defined by the distance, or width, WC) between the first and second actuation members 118A, 118B of the locking bar 118. Thus, as the battery pack 200 is moved into/out of the charging port 100, there is no contact between the battery pack 200 and the locking bar 118, with no portion of the battery pack 200 extending into the cavity 121. Thus, the locking bar 118 remains stationary, and is not actuated in response to movement of and/or contact with the battery pack 200.

Figure 5A:
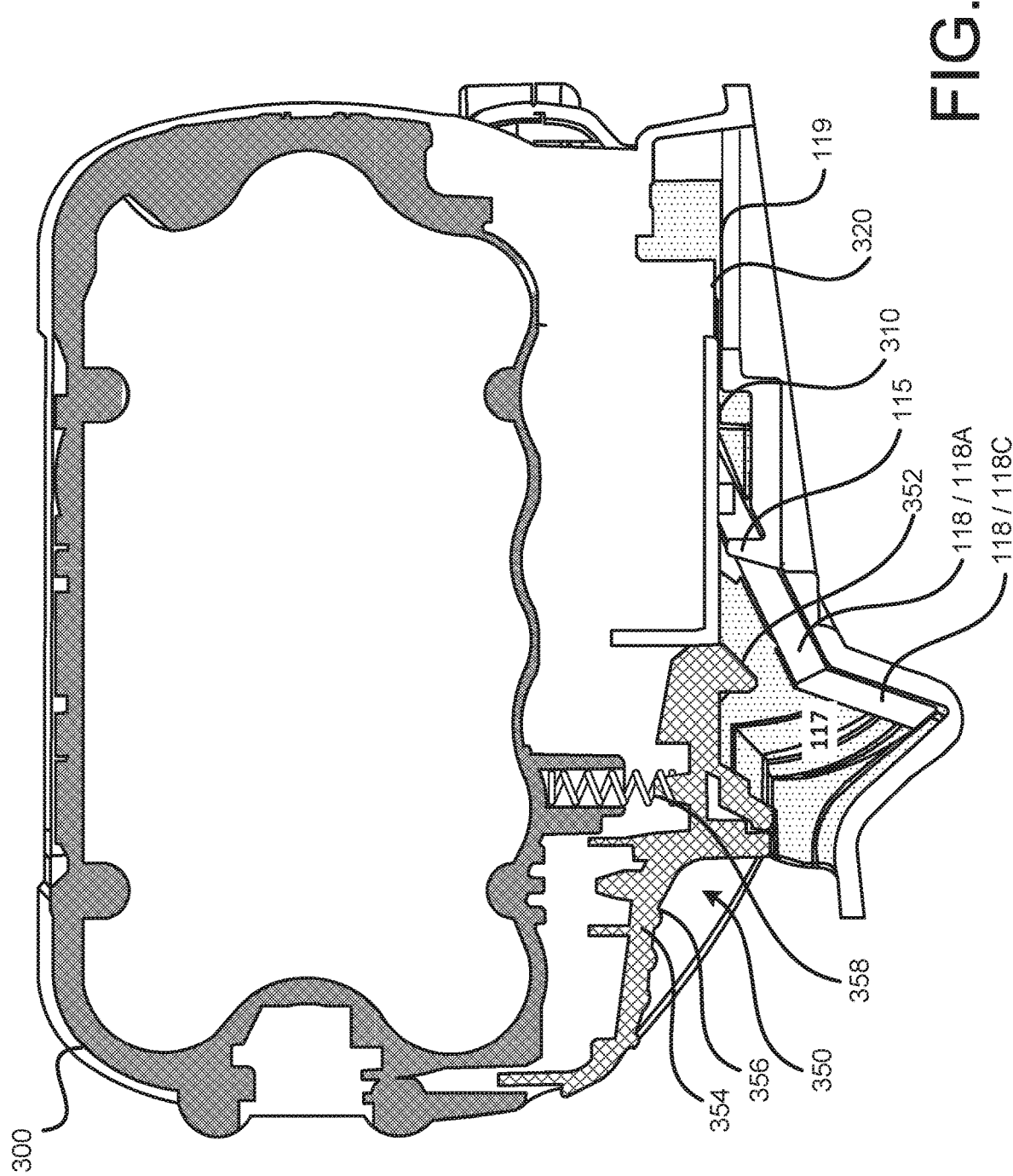
Figure 5B:
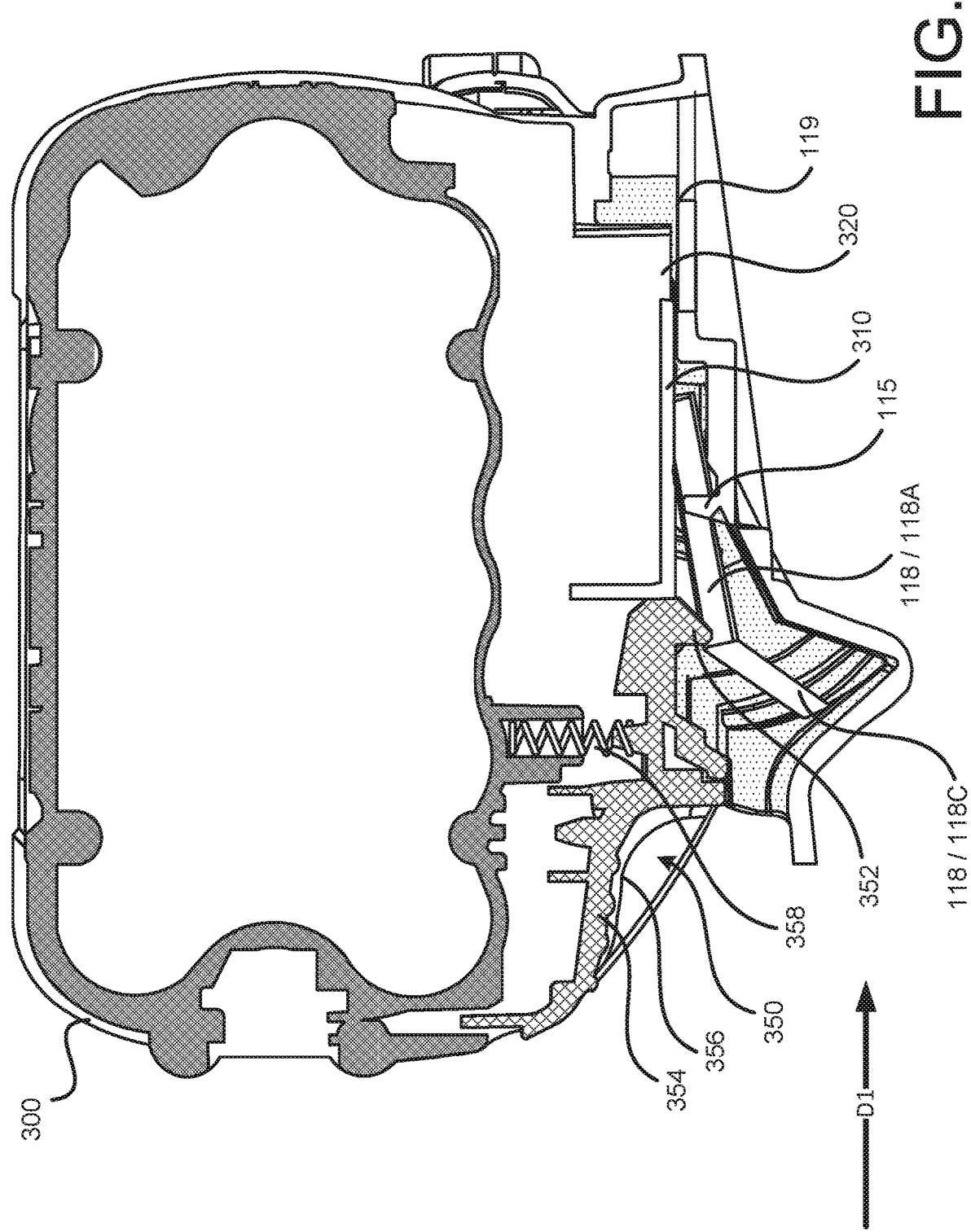
Figure 5E:
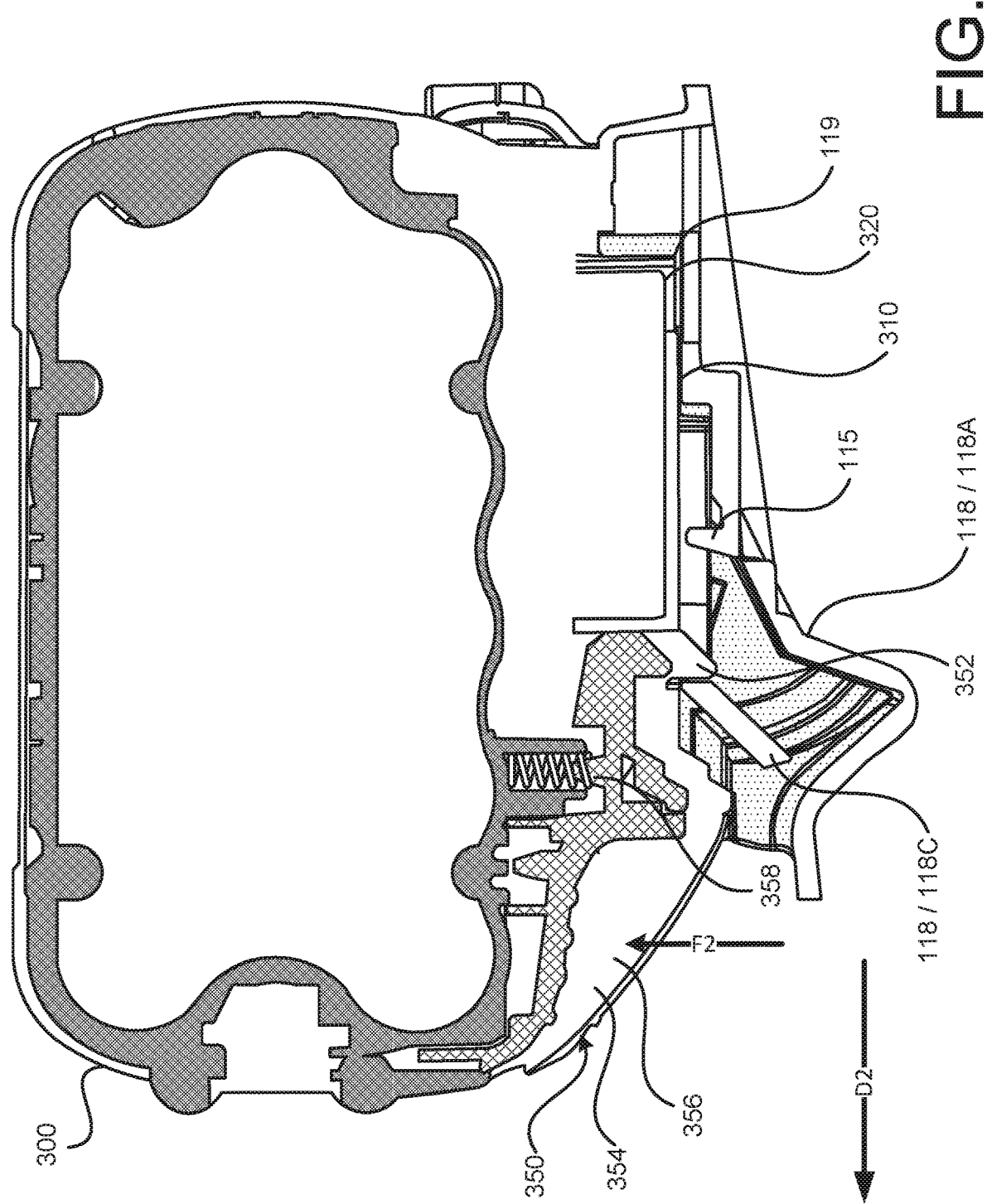
Figure 5F:
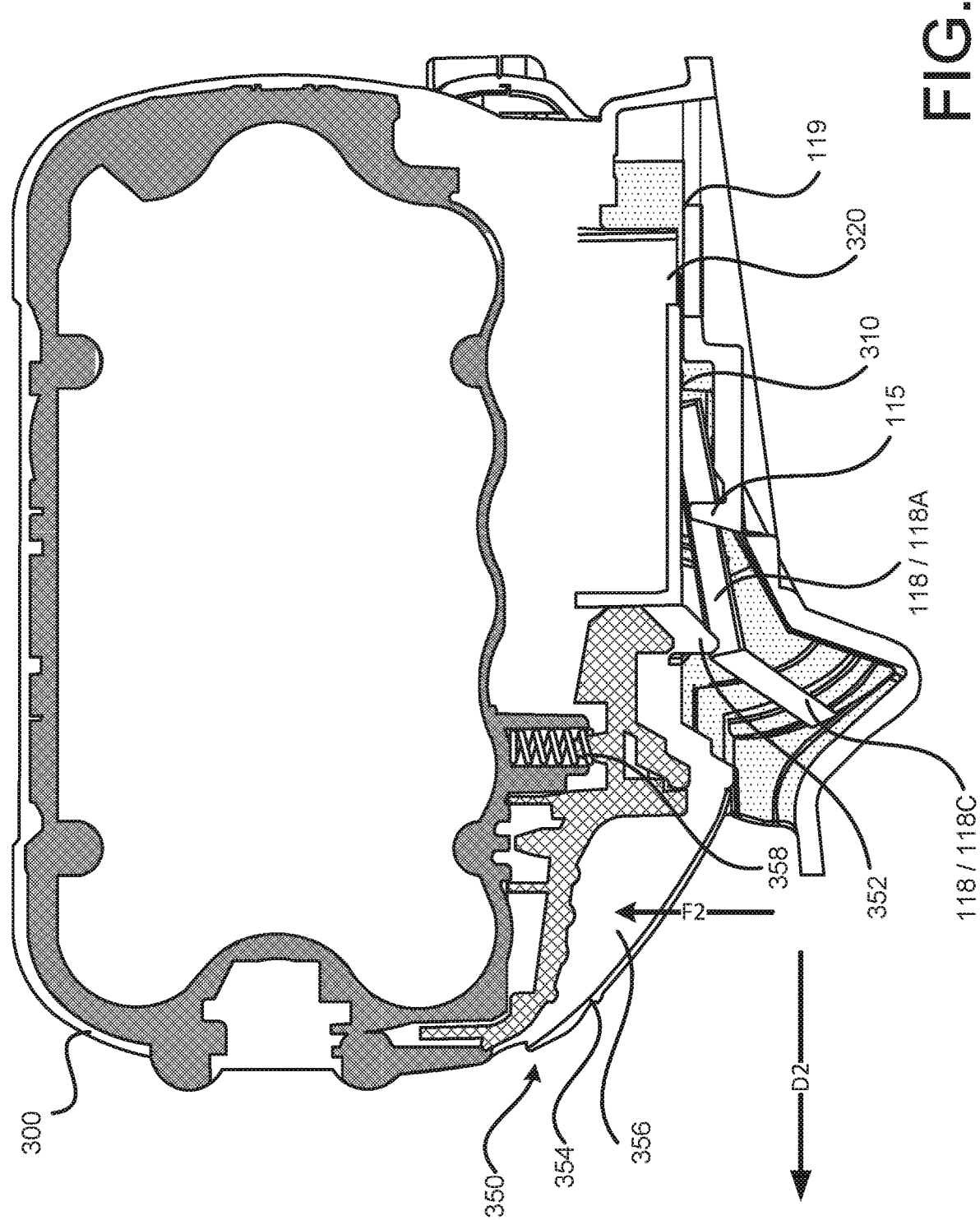

FIGS. 5A-5F illustrate the sequential insertion and removal of a second removable battery pack, such as, for example, the exemplary battery pack 300 shown in FIG. 2B, into/out of the receiving slot 116 of the charging port 100, in accordance with implementations described herein. In particular, FIGS. 5A-5D are cross sectional views illustrating the sequential insertion of the removable battery pack 300 into the charging port 100 and the latching, or locking of the battery pack 300 into the charging port 100. FIGS. 5E-5F are cross sectional views illustrating the sequential removal of the removable battery pack 300 from the charging port 100.

As noted above, the external physical and/or mechanical interfaces of the second exemplary battery pack 300 (for example, dimensions, contours and the like) may be different from the external physical and/or mechanical interfaces of the first exemplary battery pack 200. However, the first battery pack 200 and the second battery pack 300 may each be received in, and secured in, or latched in, or locked in the charging port 100 of the charger system 1000 for charging. While the external physical and/or mechanical interfaces of the first exemplary battery pack 200 and the second exemplary battery pack 300 may be different, the terminal connection interface 220 of the first battery pack 200 and the terminal connection interface 320 of the second battery pack 300 may each be arranged so as to establish an electrical connection with the terminal connection interface 119 of the charging port 100 when the respective battery pack 200, 300 is inserted in the charging port 100, to allow for effective charging.

As shown in FIGS. 2B and 5A-5F, the battery pack 300 may be inserted and secured in, or latched in, the charging port 100 with a mating surface 310 of the battery pack 200 facing the charging port 100 (i.e., upside-down when taken in the context of the orientation of the battery pack 300 illustrated in FIG. 2B relative to the example illustrated in FIGS. 5A-5F). Insertion of the battery pack 300 into the charging port 100 in this orientation will allow the terminal connection interface 320 of the battery pack 300 to connect with the terminal connection interface 119 of the charging port 100, and for the battery pack 300 to be securely coupled in the charging port 100, when the battery pack 300 is in the fully inserted, latched position shown in FIGS. 5C and 5D.

In some implementations, a latching mechanism 350 may be coupled in a body portion 340 of the battery pack 300. The latching mechanism 350 may releasably engage the locking bar 118 that is rotatably, or pivotably, coupled in the receiving slot 116 of the charging port 100, to secure the battery pack 300 in the charging port 100. The latching mechanism 350 may include a latching portion (also referred to as an engagement portion, or a catch) 352 formed at a first end portion of a body 354 of the latching mechanism 350, and a release button (also referred to as a release surface) 356 formed at a second end portion of the body 354 of the latching mechanism 350.

As shown in FIGS. 2B and 5D, a set of rails 330 may be defined at the insertion portion 340A/mating surface 310 of the battery pack 300, for example, at opposite sides of the terminal connection interface 320. As shown in FIG. 5A, the battery pack 300 may be inserted, for example, slidably inserted, into the charging port 100 through the opening 112. At the point of insertion of the battery pack 300 into the charging port 100 illustrated in FIG. 5A, the locking bar 118 is in an un-rotated, or at rest position. As the battery pack 300 is moved into the receiving slot 116 of the charging port 100, for example, in the direction D1, the mating surface 310 of the battery pack 300, and the rails 330 of the battery pack 300, contact the first and second actuation members 118A, 118B as the rails 330 are moved into the cavities 121 in which the distal ends of the actuations members 118A, 118B are received, as shown in FIG. 5B. The insertion of the rails 330 into the cavities 121 in which the distal end portion of each of the first and second actuation members 118A, 118B is received causes the locking bar 118 to rotate about the pivot shafts 118D. The continued rotation of the locking bar 118 about the pivot shafts 118D (for example, in the clockwise direction in the orientation illustrated in FIGS. 5A-5C) due to the continued movement of the battery pack 300 into the charging port 100, for example, in the direction D1, causes the actuation members 118A, 118B, to move toward a horizontal orientation, with the cross member 118C moving upward, out of the recess 117, toward the mating surface 310 of the battery pack 300. FIGS. 5C and 5D illustrate a fully inserted, secured, or engaged, position of the battery pack 300 in the charging port 100. The insertion of the rails 330 of the battery pack 300 into the cavities 121 formed in the charging port 100 may guide the insertion of the battery pack 300 into the charging port 100.

In the fully inserted, engaged position shown in FIGS. 5C and 5D, the locking bar 118 (including the actuation members 118A, 118B and the cross member 118C) are in an essentially horizontal position, with the latching portion 352 of the latching mechanism 350 of the battery pack 300 engaged with the cross member 118C of the locking bar 118. In this position, the locking bar 118, and in particular, the cross member 118C of the locking bar 118, may be considered a movable, or rotatable latching wall (compared to the stationary, or fixed latching wall 115 described in detail with respect to FIGS. 4A-4G). In this position, the battery pack 300 is secured in, or retained in, or latched in the charging port 100 due to the engagement of the latching portion 352 of the latching mechanism 350 and the cross member 118C of the locking bar 118. This may ensure that the battery pack 300 is not inadvertently released from the charging port 100 for example, during movement and/or transport of the charger system 1000, when the charger system 1000 is oriented or otherwise installed in an orientation (such as, for example, a vertical orientation) that may cause inadvertent release of the battery pack 300 from the charger system 1000, and the like. In the engaged, or secured, or latched position of the battery pack 300 in the charging port 100, an electrical connection may be established between the terminal connection interface 320 of the battery pack 300 and the terminal connection interface 119 of the charging port 100, to allow for charging of the battery pack 300. The engagement of the latching portion 352 of the latching mechanism 350 and the cross member 118C of the locking bar 118 in this manner may also help to maintain the electrical connection between terminal connection interface 119 of the charging port 100 and the terminal connection interface 320 of the battery pack 300.

The user may wish to remove the battery pack 300 from the charging port 100, for example, at the completion of a charging cycle, to install the battery pack 300 in a tool for use, to allow for charging of another battery pack in the charging port 100, and the like. When in the engaged position shown in FIGS. 5C and 5D, the user may apply a force F2 to the release button 356, as shown in FIG. 5E. The application of the force F2 may compress a spring 358 coupled on the body 354 of the latching mechanism 350, moving the latching mechanism 350 away from the charging port 100 (in the orientation shown in FIG. 5E), and releasing the engagement between the latching portion 352 and the cross member 118C of the locking bar 118. The battery pack 300 may be moved out of the charging port 100, for example, in the direction D2, while maintaining the force F2 on the release button 356 until the latching portion 352 has moved (in the direction D2) past the cross member 118C. As the battery pack 300 is moved in the direction D2, the rails 330 are moved out of the cavities 121, and the latching mechanism 352 disengages the locking bar 118, allowing the locking bar 118 to rotate back to the at rest position, as shown in FIG. 5F, and allowing the battery pack 300 to be removed from the charging port 100.

As shown in FIG. 2B, the insertion portion 340A of the body 340 of the battery pack 300 that is inserted into the charging port 100 as described above may have a dimension, for example, a width W2. In this example, the width W2 of the insertion portion 340A of the second battery pack 300, taken, for example, from the outer edge of one rail 330 to the outer edge of the other rail 330, may be greater than the width W1 of the insertion portion 240A of the first battery pack 200 shown in FIG. 2A. The external physical, or mechanical, configuration of the insertion portion 340A of the second battery pack 300 may allow for insertion of the rails 330 into the cavities 121 defined in the charging port 100, the actuation of the locking bar 118, and engagement of the latching mechanism 350 with the locking bar 118, as described above. Thus, the different physical features of the first battery pack 200 and the second battery pack 300 may allow the differently configured first and second battery packs 200, 300 to each be inserted into and latched, or secured, or retained, or locked in the charging port 100, while still providing for electrical connection between the respective terminal connection interfaces 220, 320 of the battery packs 200, 300 and the terminal connection interface 119 of the charging port 100.

As shown in FIGS. 5A-5F, as the battery pack 300 is inserted into/removed from the charging port 100, there is no contact, or interaction, between the battery pack 300 and/or any portion of the latching mechanism 350 of the battery pack 300, and the latching wall 115 (that selectively engages and secures, or retains, the first battery pack 200 as described above). As the battery pack 300 is inserted into the charging port 100, the movement of the battery pack 300 is guided by the insertion of the rails 330 into the cavities 121 and resulting actuation of the actuation members 118A, 118B and engagement of the latching portion 352 with the cross member 118C of the locking bar 118. Thus, as the battery pack 300 is moved into/out of the charging port 100, there is no interaction between the battery pack 300 and the latching wall 115 due to the external physical/mechanical features of the battery pack 300.

As noted above, in some implementations, the charger system 1000 may include one or more indicators 180, to indicate a state of charge of a removable battery received in a corresponding charging port 100 of the charger system 1000. In some implementations, the one or more indicators 180 may display an indication of the state of charge of the removable battery pack received in the corresponding charging port 100. For example, in some implementations, the one or more indicators 180 may be illuminated to provide an indication of the state of charge of the battery pack received in the corresponding charging port 100. In some implementations, the one or more indicators 180 may be illuminated in a particular color, or colors, to indicate the state of charge of the removable battery pack received in the corresponding charging port 100. In some implementations, the one or more indicators 180 may be illuminated in a particular illumination pattern, or patterns, to indicate the state of charge of the removable battery pack received in the corresponding charging port 100. In some implementations, the one or more indicators 180 may be illuminated in a combination of colors and illumination patterns to indicate the state of charge of the removable battery pack received in the corresponding charging port 100.

In some implementations, the one or more indicators 180 may simply be illuminated when the removable battery pack received in the corresponding charging port 100 reaches its full charge capacity, and/or an illumination color emitted by the one or more indicators may change when the removable battery pack received in the corresponding charging port 100 reaches its full charge capacity. However, utility and user convenience may be enhanced by an indicator 180 that can display incremental states of charge of the removable battery pack received in the corresponding charging port 100.

For example, a removable battery pack such as, for example, the first and second removable battery packs 200, 300 described above, coupled in a charger system such as, for example, the charger system 1000 described above, may achieve a relatively useful charge capacity relatively quickly in the charge cycle. For example, in some implementations, removable battery packs such as, for example, the first and second removable battery packs 200, 300 described above, may reach approximately 80% charge capacity at approximately halfway through the respective charge cycle. An indication of an incremental state of charge by the one or more indicators 180 may allow a user to, for example, plan for use of the removable battery packs coupled in the charging ports 100, remove a battery pack from the charging port 100 at an acceptable incremental charge level for use in a particular job, and the like.

Example illumination schemes that may be implemented by one of the one or more indicators 180 are shown in FIGS. 6A and 6B. The indicator 180 may include a first section 182 (or first indicator) and a second section 184 (or second indicator). Each of the first section 182 and the second section 184 may change, depending on a detected state of charge of the battery pack received in the corresponding charging port 100. For example, each of the first section 182 and the second section 184 of the indicator 180 may emit a different color and/or a different illumination pattern, depending on the detected state of charge of the battery pack received in the corresponding charging port 100.

In the example shown in FIG. 6A, in a State A, in which the battery pack has a relatively low charge level (for example, approximately 0%, or below a set incremental charge level, such as, for example, approximately 80%), the first section 182 of the indicator 180 may blink while the second section 184 of the indicator 180 remains in the off state, to indicate a state of charge below the set incremental charge level. In a State B, at which the battery pack reaches the set incremental charge level, the first section 182 of the indicator 180 may remain illuminated (i.e., without blinking), while the second section 184 of the indicator 180 remains in the off state, to indicate that the battery pack has achieved at least the incremental charge level. In a State C, at which the battery pack has achieved a substantially full charge capacity, both the first section 182 and the second section 184 of the indicator 180 may be illuminated, to indicate the battery pack is fully charged.

In the example shown in FIG. 6B, in the State A, the first section 182 of the indicator 180 may emit a first color, and may blink, while the second section 184 of the indicator 180 remains in the off state, to indicate a state of charge below the set incremental charge level. In the State B, the first section 182 of the indicator 180 may continuously emit the first color and remain illuminated (i.e., without blinking), while the second section 184 of the indicator 180 remains in the off state, to indicate that the battery pack has achieved at least the incremental charge level. In the State C, the first section 182 may be illuminated in a second color, to indicate the battery pack is fully charged.

FIGS. 6A and 6B illustrate just two examples of how the one or more indicators 180 may output an indication of an incremental state of charge. For example, in some implementations, different colors and/or combinations of colors and/or different illumination patterns may be applied to one, or both, of the sections 182, 184 of the indicator 180. In some implementations, a progress bar may be displayed to indicate a state of charge. In some implementations, the first section 182 may be larger than the second section 184 of the indicator 180, to provide a visual indication of a relatively greater level of charge achieved by illumination of the larger section of the indicator 180.

In some situations, the ability to mount, for example, temporarily mount, the charger station 1000 at a designated location at a work site may enhance utility and functionality, as well as user convenience. As illustrated in the example shown in FIGS. 7A-7D, in some implementations, the charger station 1000 may be mounted to, for example, framework at a work site. In the example illustrated in FIGS. 7A-7B, the charger system 1000 is mounted to a support structure 710 defined by two adjacent, vertically oriented studs 720, 730 at a work site 700. Other arrangements which provide sufficient structural support, for example, capable of supporting the weight of the charger station 100 (including, for example, one or more removable battery packs attached thereto for charging and/or storage), forces applied due to, for example, removal and replacement of battery packs into the charging ports 100, and the like, may also define a support structure 710 to which the charger system 1000 may be mounted.

Figure 7C:
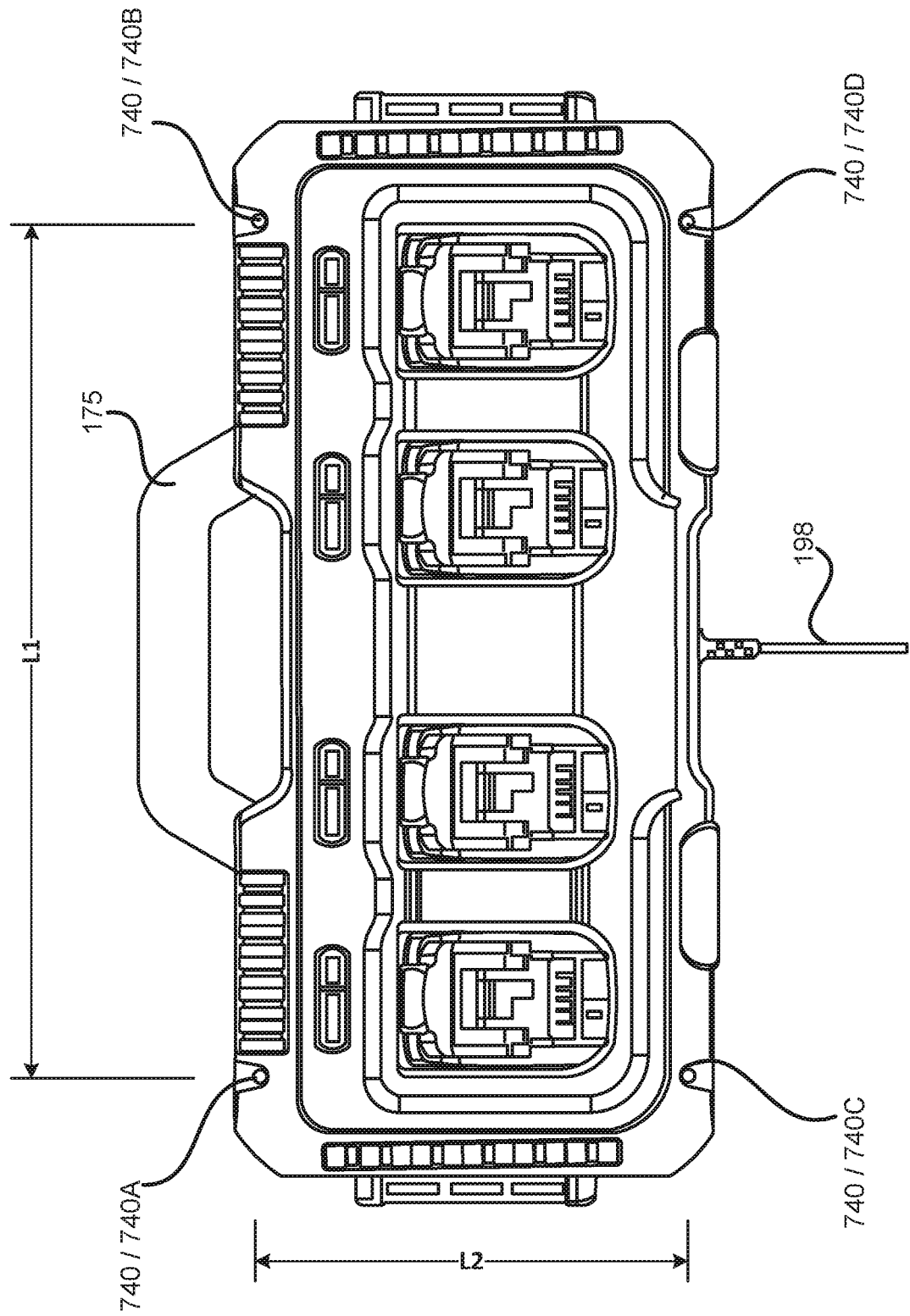
Figure 7D:
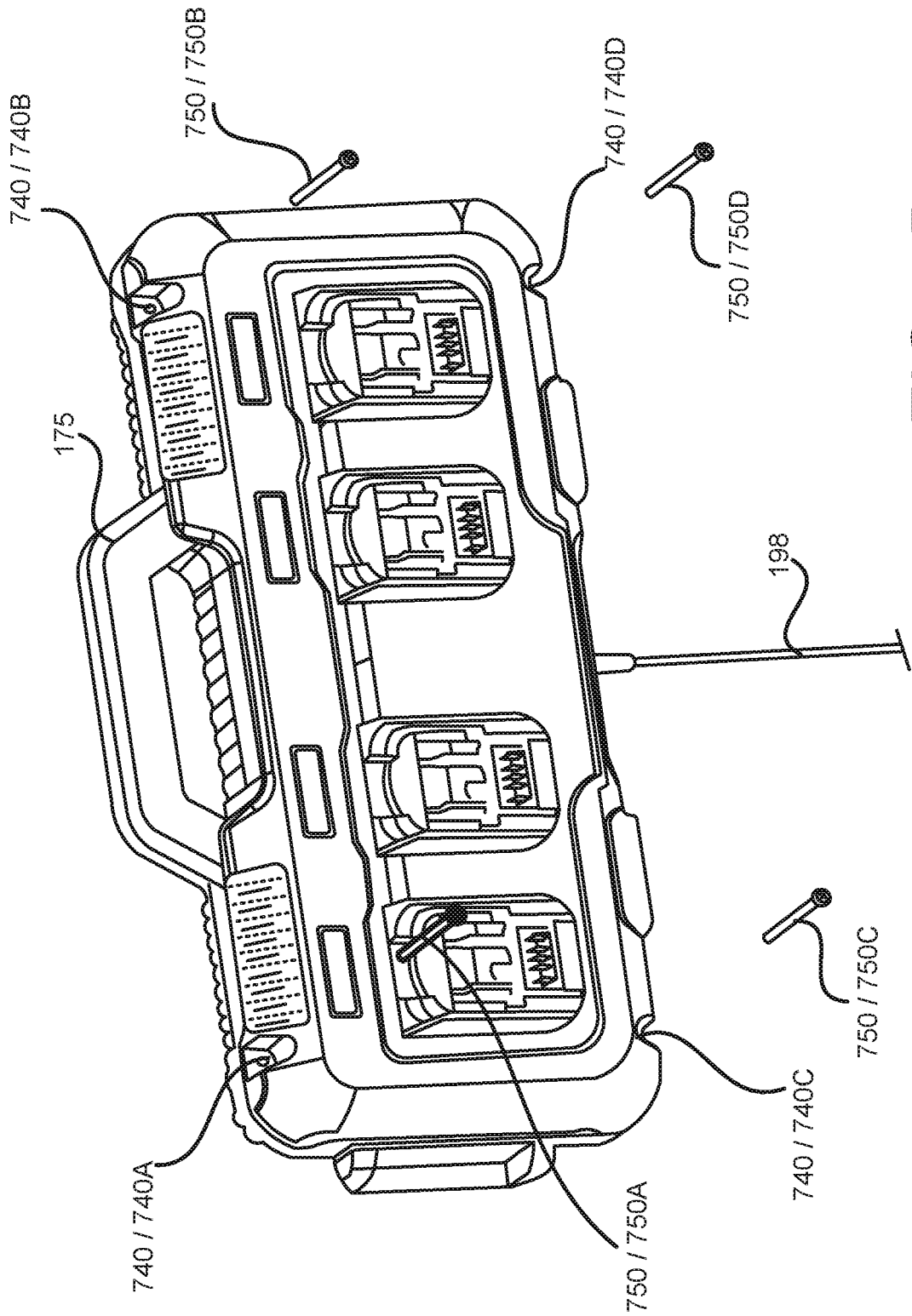

As shown in FIGS. 7C and 7D, a plurality of fasteners 750 may extend through a plurality of mounting apertures 740 formed in the housing 160 of the charger system 1000 and into the support structure 710 to couple the charger system 1000 to the support structure 710. In the example illustrated in FIGS. 7C-7D, four mounting apertures 740 (740A, 740B, 740C and 740D) are defined in the housing 160, with four corresponding fasteners 750 (750A, 750B, 750C and 750D) to fasten the charger system 1000 to the support structure 710, for purposes of discussion and illustration. More, or fewer, mounting apertures 740 and fasteners 750 may be used to mount the charger system 1000 to the support structure 710. In the example shown in FIGS. 7A-7D, a first distance L1 between the first and second mounting apertures 740A, 740B, and between the third and fourth mounting apertures 740C, 740D may correspond to, for example, a distance between the adjacent studs 720, 730 defining the support structure 710 in the example shown in FIG. 7A. A second distance L2 between the first and third mounting apertures 740A, 740C, and between the second and fourth mounting apertures 740B, 740D, may be set based on, for example, physical features of the housing 160, support and stability requirements for the charger system 1000, and the like.

In the example shown in FIGS. 7A-7D, the mounting apertures 740 may be located on the charger system 1000 to facilitate the mounting of the charger system 1000 on the support structure 710. The charger system 1000 may be carried to the mounting location and held by the handle 175, so that the mounting apertures 740 are easily visible to the installer. As the mounting apertures 740 are easily visible to the installer, the installer may install the first fastener 750A through the first mounting aperture 740A and into the first stud 720, and the second fastener 750B through the second mounting aperture 740B and into the second stud 730, without the need to, for example, measure and mark the support structure 710 to indicate attachment points prior to mounting. The third fastener 750C may then be installed through the third mounting aperture 740C and into the first stud 720, and the fourth fastener 750D may be installed through the fourth mounting aperture 740D and into the second stud 730 to provide additional support and stability to the mounting of the charger system 1000 on the support structure 710. The charger system 1000 may be connected to an external power source via, for example, a power cord 198, to provide battery pack charging capability at the work site.

The mounting of the charger system 1000 to the support structure 710 as described in the example illustrated in FIGS. 7A-7D may allow the charger system 1000 to be stably mounted for use while at a particular work site, in a location that is convenient to the user, but does not obstruct, or impede, or pose an obstacle and/or a hazard, to work being done at the work site.

As noted above, electronic components of the charger system 1000 may be received within the housing 160. These electronic components may include, for example, printed circuit boards (PCBs) having identical functionality for receiving power from an external source, and providing power to a corresponding charging port 100. In some situations, the enclosed housing 160 may provide limited venting to these electronic components, resulting in relatively low cooling airflow across the PCBs, and relatively poor cooling in certain regions on the PCBs. For example, when using two physically identical PCBs to provide this identical functionality, the various heat generating components (i.e. rectification diodes, transformer, switching MOSFET) of one of the PCBs may be positioned in the poor cooling region, potentially degrading the performance of that PCB.

Figure 8:
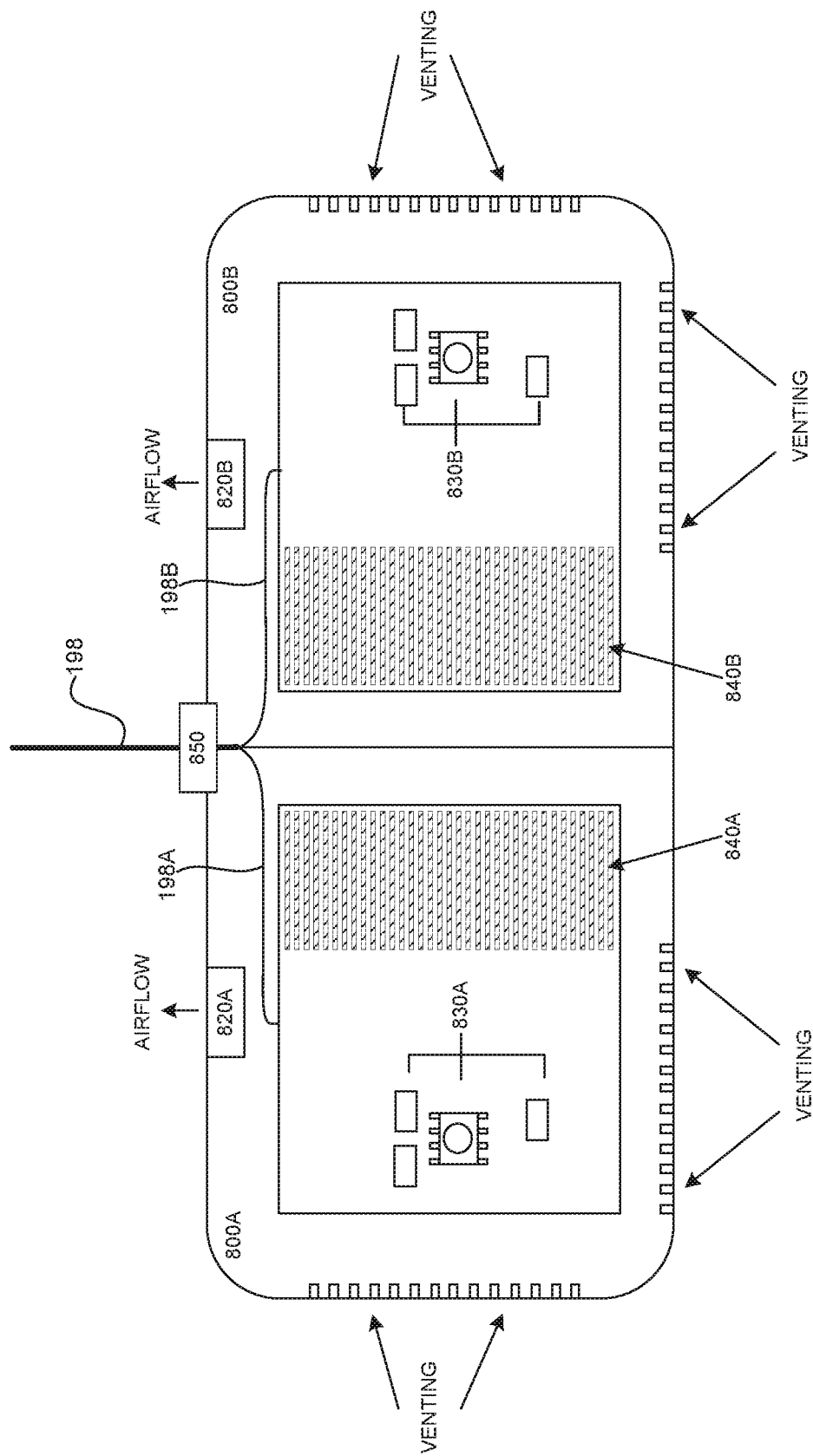
FIG. 8 is a schematic view of a mirrored printed circuit board of a removable battery pack charger system, in accordance with implementations described herein.

As shown in FIG. 8, in some implementations, the charger system 1000 may include an enclosed electronics assembly, including a first PCB 800A with a first fan 820A, and a second PCB 800B with a second fan 820B. In this example, the first PCB 800A and the second PCB 800B are functionally identical, and utilize mirror image positioning of heat producing components 830A, 830B to optimize airflow across the PCBs 800A, 800B for cooling. The mirrored positioning of the heat generating components 830A, 830B illustrated in FIG. 8 places the heat generating components 830A, 830B of both PCBs 800A, 800B in the path of cooling flow generated by the fans 820A, 820B, rather than in the respective poor cooling flow regions 840A, 840B of the PCBs 800A, 800B. As previously described, power may be supplied to the charger system 1000 from an external power source via, for example, a power supply cord 198 coupled to the housing 160. In some implementations, the power supply cord 198 may be coupled to the charger system 1000 an approximately central portion of the housing 160 (for example, as shown in FIGS. 7A-7C). In this exemplary arrangement, the power supply cord 198 may be centered on the two PCBs 800A, 800B, for example, at an approximate location 850 shown in FIG. 8. This may allow a first internal cord 198A and a second internal cord 198B conveying power from the power supply cord 198 to each of the PCBs 800A, 800B to have essentially the same length.

A removable battery pack charger system 1000', in accordance other implementations, is illustrated in FIGS. 9A-9F. The charger system 1000' may include one or more charging ports 100' arranged along an outer portion of a housing 160'. Each of the one or more charging ports 100' may include a terminal connection interface 119' at a first, terminal end of the charging port 100', and an opening 112' at a second, open end of the charging port 100' through which removable battery packs may be inserted into and removed from the charging port 100'. A charger latch 115' may be positioned proximate the open end of the charging port 100'. The charger latch 115' may selectively engage and disengage a plurality of different removable battery packs to secure, or retain, or latch, or lock the battery pack in the charging port 100', and to release the battery pack from the charging port 100'. The charging port 100' may be configured to accommodate a plurality of different removable battery packs for charging. The plurality of different battery packs to be accommodated and retained in the charging port 100' may have different external physical/mechanical interfaces, and/or different voltage ratings, as described above in detail with respect to the first battery pack 200 and the second battery pack 300 shown in FIGS. 2A and 2B. The plurality of different battery packs to be accommodated in the charging port 100' may include terminal connection interfaces that are arranged so as to establish an electrical connection with the terminal connection interface 119' of the charging port 100'.

Figure 9A:
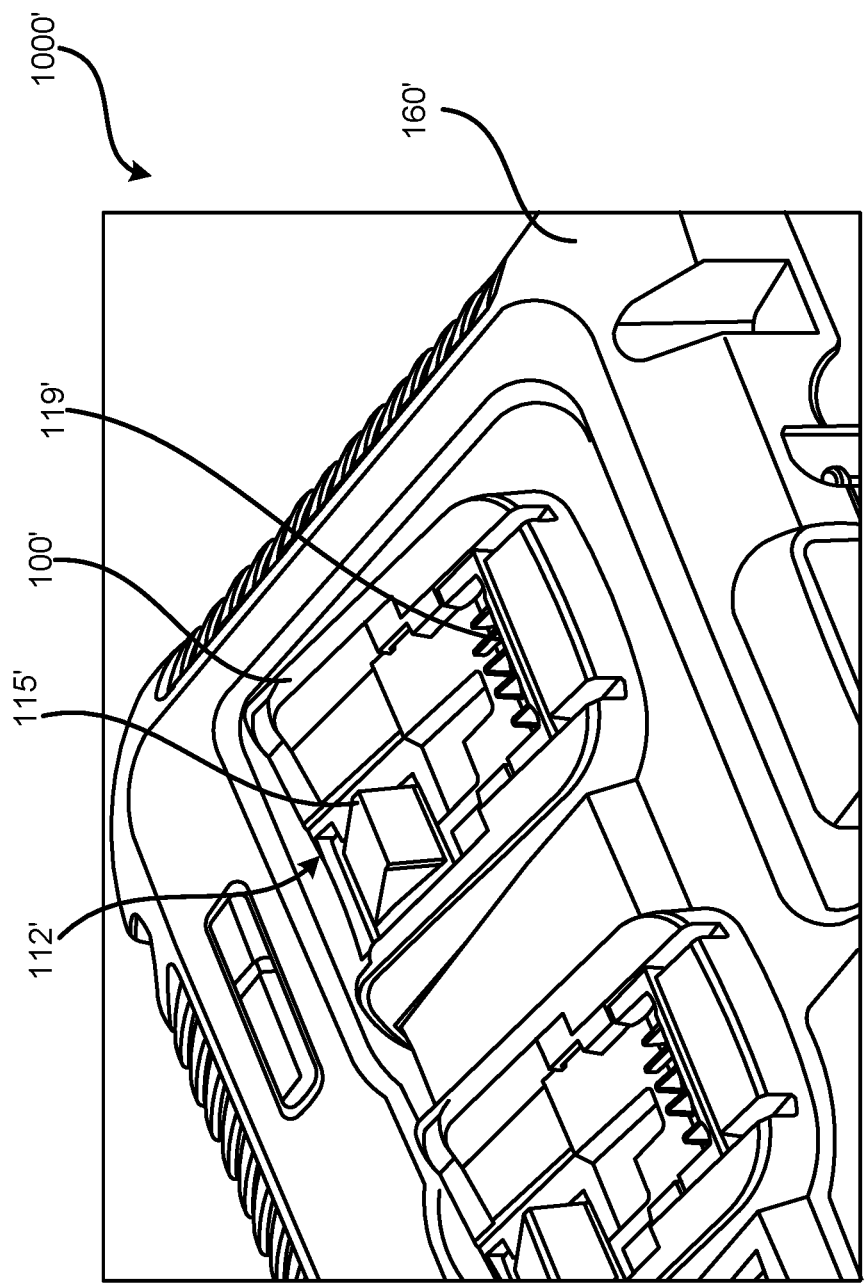
Figure 9B:
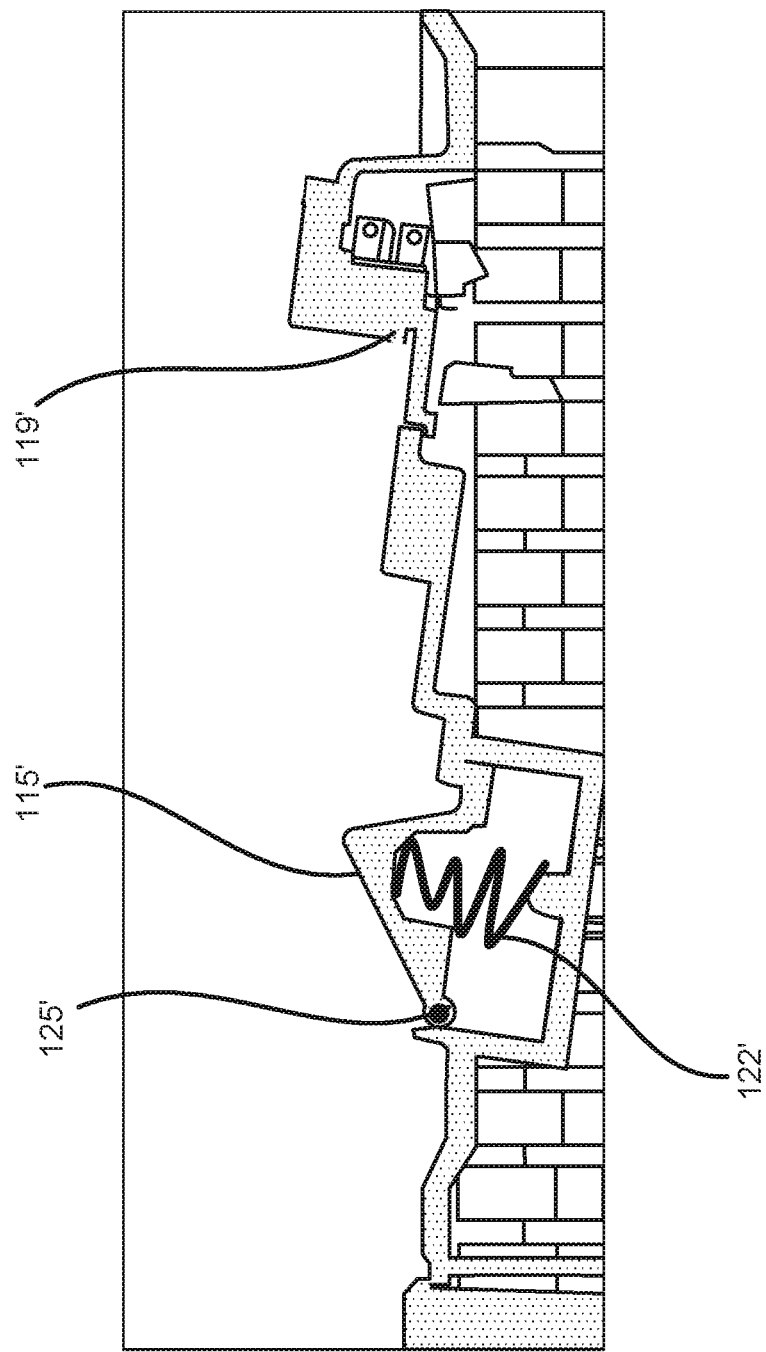

A cross sectional view of the charging port 100' is shown in FIG. 9B. As shown in FIG. 9B, the charger latch 115' may be mounted on a first coil spring 122'. The charger latch 115' may be pivotable, or rotatable, about a pivot axis 125'. The charger latch 115' may pivot about the pivot axis 125' in a clockwise direction (in the orientation of FIG. 9F) as the charger latch 115' is depressed and the first spring 122' is compressed in response to a force, for example a downward force, applied to the charger latch 115'. The spring 122' may bias the charger latch 115' in an outward (for example, upward, in the orientation shown in FIG. 9B) upon removal of the downward force.

Figure 9D:
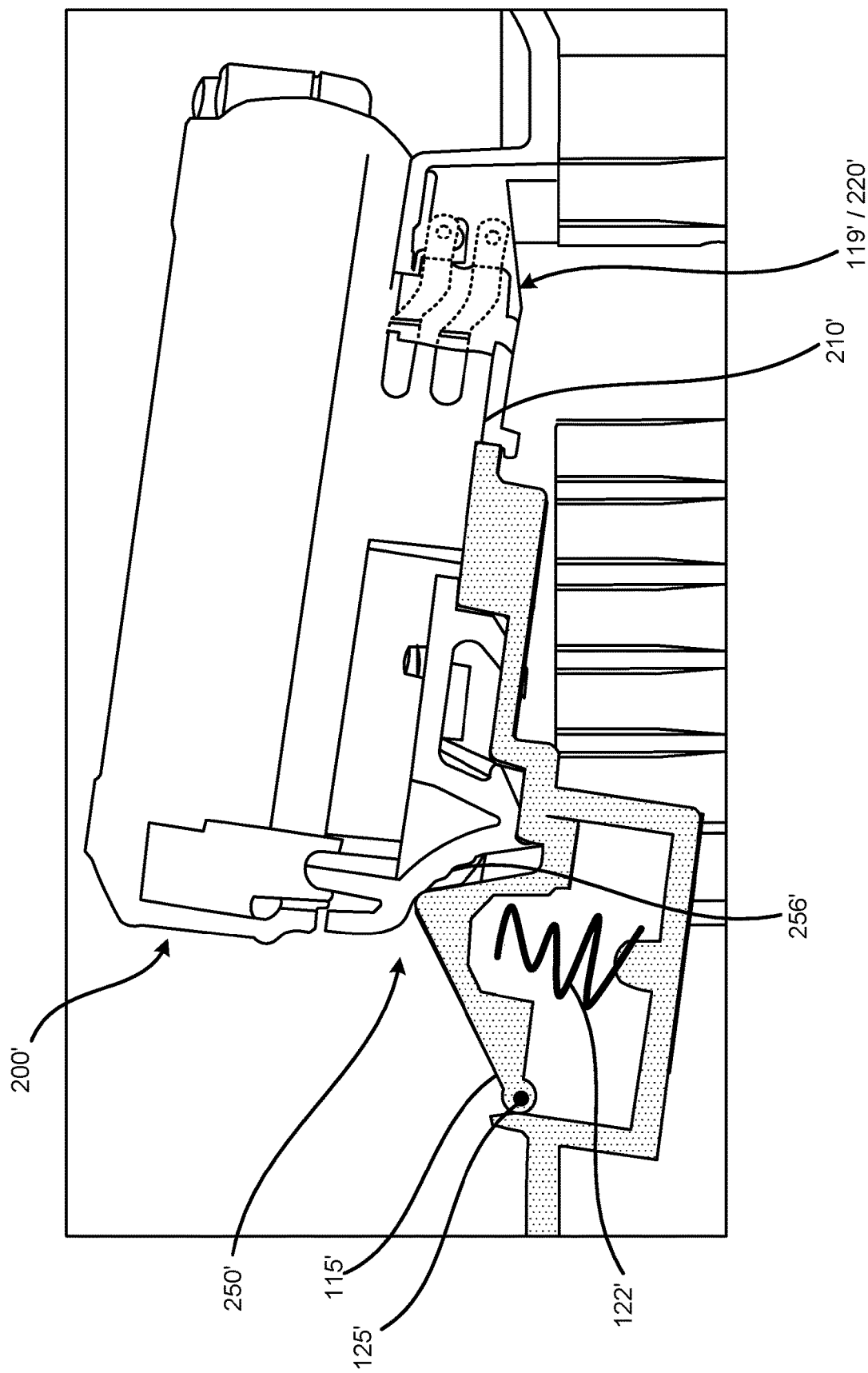

FIG. 9C illustrates a first removable battery pack 200' installed in the charging port 100' of the charger system 1000', and FIG. 9D is a cross sectional view of the exemplary installation of the first removable battery pack 200' in the charging port 100' as shown in FIG. 9C, in accordance with implementations described herein. As shown in FIGS. 9C and 9D, as the first battery pack 200' is moved through the open end 112' and into the charging port 100', a mating surface 210' of the battery pack 200' contacts the charger latch 115'. Continued movement of the first battery pack 200' into the charging port 100' and continued contact with the mating surface 210' causes the first spring 122' to compress, and the charger latch 115' to pivot about the pivot axis 125' (for example, in the clockwise direction about the pivot axis 125' in the orientation shown in FIG. 9D).

With the first spring 122' compressed and the charger latch 115' in the pivoted position, the first battery pack 200' is moved into the charging port 100' until the terminal connection interface 220' of the first battery pack 200' is connected with the terminal connection interface 119' of the charging port 100'. The continued movement of the first battery pack 200' into the charging port 100' causes the charger latch 115' to move along a latching mechanism 250' of the first battery pack 200' and into contact with a release button 256' of the latching mechanism 250'. As the charger latch 115' moves into contact along the contoured surface of the release button 256', the charger latch 115' is biased outward by the release of the downward force on the first spring 122', such that the charger latch 115' is engaged against the release button 256' of the latching mechanism 250' of the first battery pack 200'. The engagement of the charger latch 115' against the release button 256' of the first battery pack 200' may secure, or latch, or retain the first battery pack 200' in the charging port 100'.

To disengage the charger latch 115' and the latching mechanism 250', and remove the first battery pack 200' from the charging port 100', a downward force may be applied to the charger latch 115'. This downward force may cause the first spring 122' to compress and the charger latch 115' to rotate about the pivot axis 125' (for example, rotate clockwise about the pivot axis 125' in the arrangement shown in FIG. 9D). The rotation of the charger latch 115' in this manner may release the engagement of the charger latch 115' and the release button 256' of the latching mechanism 250', allowing first battery pack 200' to be removed from the charging port 100'.

Figure 9E:
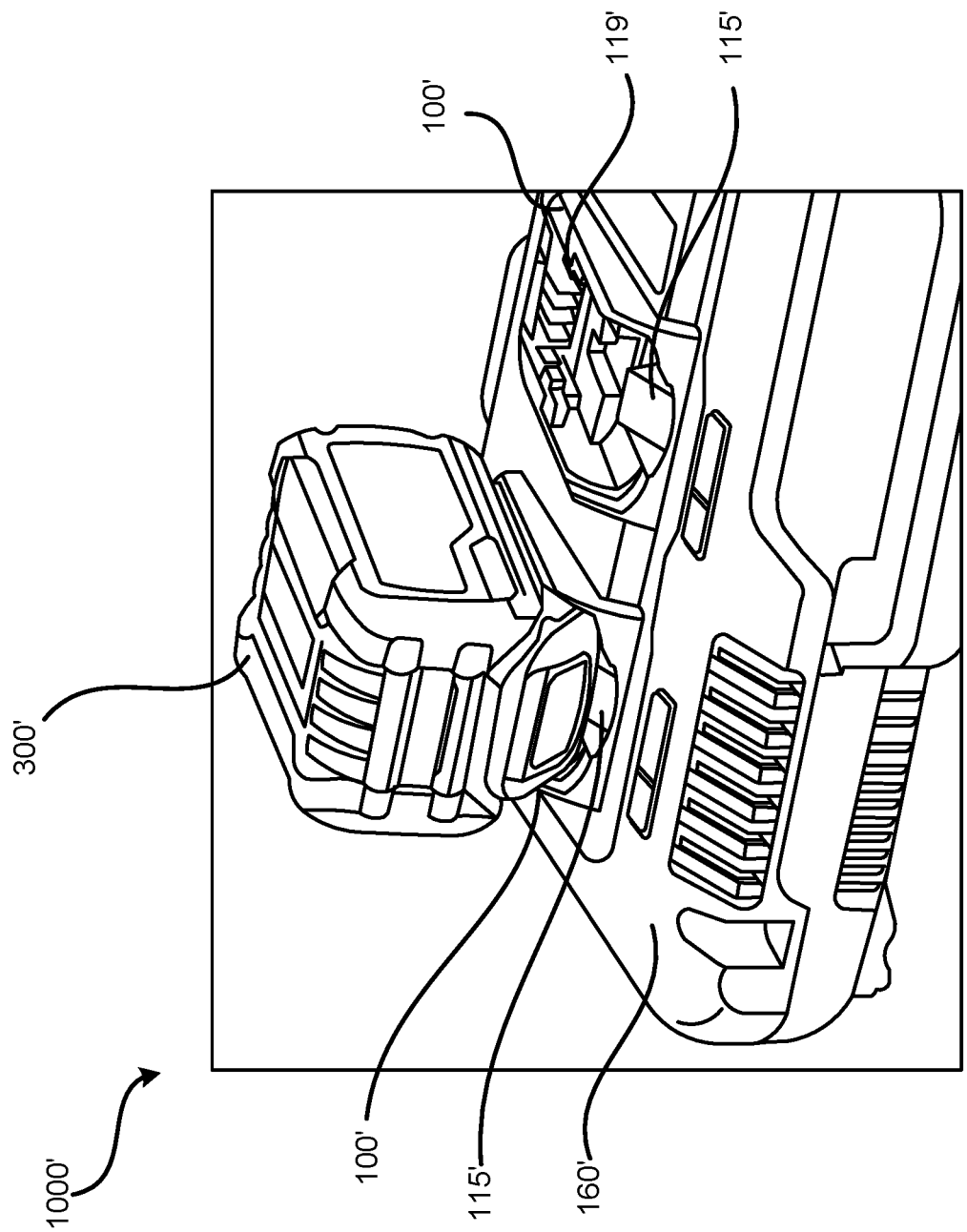
Figure 9F:
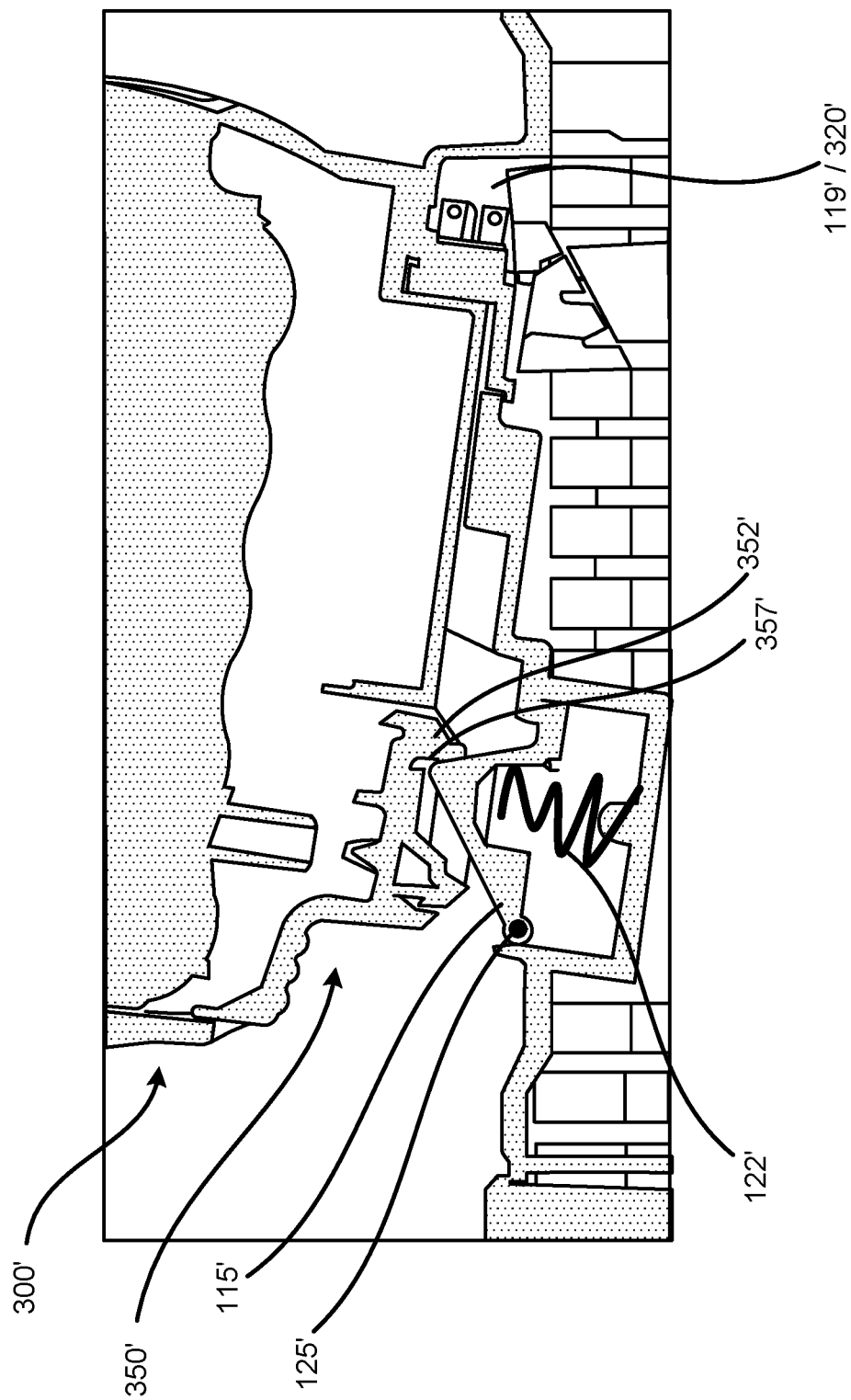

FIG. 9E illustrates a second removable battery pack 300' installed in the charging port 100' of the charger system 1000', and FIG. 9F is a cross sectional view of the exemplary installation of the second removable battery pack 300' in the charging port 100' as shown in FIG. 9E, in accordance with implementations described herein. As shown in FIGS. 9E and 9F, as the second battery pack 300' is moved through the open end 112' and into the charging port 100', a mating surface 310' of the battery pack 300' contacts the charger latch 115'. Continued movement of the second battery pack 300' into the charging port 100' and continued contact with the mating surface 310' causes the first spring 122' to compress, and the charger latch 115' to pivot about the pivot axis 125' (for example, in the clockwise direction about the pivot axis 125' in the orientation shown in FIG. 9F).

With the first spring 122' compressed and the charger latch 115' in the pivoted position, the second battery pack 300' is moved into the charging port 100' until the terminal connection interface 320' of the second battery pack 300' is connected with the terminal connection interface 119' of the charging port 100'. The continued movement of the second battery pack 300' into the charging port 100' causes the charger latch 115' to move along a latching mechanism 350' of the second battery pack 300' and into an engagement recess 357' of the latching mechanism 350'. The engagement recess 357' may be delineated by the latching portion 352', a first exterior surface of the housing of the battery pack 300', and a second exterior surface of the housing of the battery pack 300'. As the charger latch 115' moves into the engagement recess 357', the charger latch 115' is biased outward by the release of the downward force on the first spring 122', such that the charger latch 115' is engaged in the engagement recess 357' of the latching mechanism 350' of the second battery pack 300'. The engagement of the charger latch 115' in the engagement recess 357' of the second battery pack 300' may secure, or latch, or retain the second battery pack 300' in the charging port 100'.

To disengage the charger latch 115' and the latching mechanism 350' of the second battery pack 300', and remove the second battery pack 300' from the charging port 100', an upward force may be applied to a release button 356' of the latching mechanism 350' of the second battery pack 300'. This upward force applied to the release button 356', or depression of the release button 356', may compress a spring 358' of the latching mechanism 350', moving the latching mechanism 350' and the latching portion 352' into the second battery pack 300' and releasing the charger latch 115' from the engagement recess 357' of the latching mechanism 350' of the second battery pack 300'. This movement of the charger latch 115' out of the engagement recess 357' may allow the second battery pack 300' to be removed from the charging port 100'.

In a removable battery pack charger system, in accordance with implementations described herein, a charger system including one or more charger ports may receive a plurality of different removable battery packs for charging. For example, in some implementations, each of the one or more charging ports may be configured to receive at least a first battery pack having a first external physical interface and a second battery pack having a second external physical interface. In some implementations, each of the one or more charging ports may include a first feature that secures, or retains, or locks the first battery pack in the charging port, and a second feature that secures, or retains, or locks the second battery pack in the charging port.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A battery charger system, comprising:
   a housing;
   a plurality of electronic components received in the housing; and a plurality of charging ports arranged on an external portion of the housing, wherein each charging port of the plurality of charging ports includes:
a receiving slot configured to receive at least a first battery pack and a second battery pack;
a first physical feature defined on a lower surface portion of the receiving slot, wherein the first physical feature is configured to engage a first external mechanical interface on the first battery pack to selectively lock the first battery pack in the charging port; and
a second physical feature rotatably positioned in the receiving slot, wherein the second physical feature is configured to engage a second external mechanical interface on the second battery pack to selectively lock the second battery pack in the charging port.

2. The system of claim 1, wherein each charging port, of the plurality of charging ports, includes:
a first lateral wall;
a second lateral wall opposite the first lateral wall;
a terminal end wall extending between a first end portion of the first lateral wall and a first end portion of the second lateral wall; and
an opening defined between a second end portion of the first lateral wall and a second end portion of the second lateral wall,
wherein the receiving slot is defined by the first lateral wall, the second lateral wall and the terminal end wall, the receiving slot being configured to receive therein at least the first battery pack and the second battery pack through the opening.

3. The system of claim 2, wherein the receiving slot has a first width at a first portion of the receiving slot, and a second width at a second portion of the receiving slot, and wherein the first width is less than the second width.

4. The system of claim 3, wherein
the first width of the receiving slot corresponds to a distance between an inner surface portion of the first lateral wall and an inner surface portion of the second lateral wall at the respective first end portions of the first and second lateral walls, and
the second width of the receiving slot corresponds to a distance between an inner surface portion of the first lateral wall and an inner surface portion of the second lateral wall at the respective second end portions of the first and second lateral walls.

5. The system of claim 3, wherein the first physical feature includes:
a latching wall defined in the receiving slot, wherein the latching wall extends upward from the lower surface portion of the receiving slot into the receiving slot; and
a guide defined by the first portion of the receiving slot having the first width.

6. The system of claim 5, wherein
the latching wall is oriented substantially orthogonal to the first and second lateral walls, such that the latching wall is configured to engage a latching portion of a latching mechanism of the first battery pack as the first battery pack is moved into the receiving slot through the opening, and
the guide is configured to guide a corresponding insertion portion of the first battery pack toward the terminal end wall of the receiving slot as the first battery pack is moved into the receiving slot so as to align the latching portion for engagement with the latching wall.

7. The system of claim 3, wherein the second physical feature includes:

a locking bar rotatably coupled in the second portion of the receiving slot, the locking bar including:
a first actuating member positioned along a first edge portion of the second portion of the receiving slot, corresponding to the inner surface portion of the first lateral wall;
a second actuating member positioned along a second edge portion of the second portion of the receiving slot, corresponding to the inner surface portion of the second lateral wall; and
a cross member extending between the first actuating member and the second actuating member.

8. The system of claim 7, wherein
a first end portion of the first actuating member is rotatably coupled to the first lateral wall;
a first end portion of the second actuating member is rotatably coupled to the second lateral wall; and
the cross member extends between a second end portion of the first actuating member and a second end portion of the second actuating member.

9. The system of claim 8, wherein, in a first position of the locking bar, the locking bar is positioned at an angle in the receiving slot, wherein, in the first position,
the cross member is positioned in a recess formed in the receiving slot, adjacent to the opening into the receiving slot,
the first actuating member extends upward from the cross member, such that the second end portion of the first actuating member is positioned in a first cavity defined by the inner surface of the first lateral wall and a first top surface extending from a top of the first lateral wall into the receiving slot, and
the second actuating member extends upward from the cross member, such that the second end portion of the second actuating member is positioned in a second cavity defined by the inner surface of the second lateral wall and a second top surface extending from a top of the second lateral wall into the receiving slot.

10. The system of claim 9, wherein the locking bar is configured to rotate from the first position to second position in response to insertion of the second battery pack into the receiving slot, the second position being a substantially horizontal position, such that the cross member engages a latching portion of a latching mechanism of the second battery pack in the second position.

11. The system of claim 9, wherein the first actuating member is configured to be actuated in response to insertion of a first rail of the second battery pack into the first cavity, and the second actuating member is configured to be actuated in response to insertion of a second rail of the second battery pack into the second cavity, as the second battery pack is inserted into the receiving slot.

12. The system of claim 11, wherein the locking bar is configured to rotate from the first position to a second position in response to actuation of the first actuating member and actuation of the second actuating member, such that, in the second position the locking bar is positioned substantially horizontally and the cross member of the locking bar engages a latching portion of a latching mechanism of the second battery pack.

13. The system of claim 12, wherein the locking bar is configured to rotate from the second position to the first position in response to removal of the first rail from the first cavity and removal of the second rail from the second cavity as the second battery pack is removed from the receiving slot.

14. The system of claim 12, wherein the cross member of the locking bar is configured to disengage the latching portion of the latching mechanism in response to rotation of the locking bar from the second position to the first position.

15. A charging port of a battery charger system, the charging port comprising:
a receiving slot defined by:
a first lateral wall;
a second lateral wall;
an end wall extending between a first end portion of the first lateral wall and a first end portion of the second lateral wall; and
an opening formed between a second end portion of the first lateral wall and a second end portion of the second lateral wall;
a fixed latching wall fixedly positioned in the receiving slot, wherein the fixed latching wall is configured to selectively latch a first battery pack in the receiving slot, the first battery pack having a first external mechanical interface; and
a rotatable latching wall rotatably positioned in the receiving slot, wherein the rotatable latching wall is configured to selectively latch a second battery pack in the receiving slot, the second battery pack having a second external mechanical interface, the second external mechanical interface of the second battery pack being different from the first external mechanical interface of the first battery pack.

16. The charging port of claim 15, wherein the fixed latching wall is configured to engage a latching portion of a latching mechanism of the first battery pack as the first battery pack is inserted into the receiving slot.

17. The charging port of claim 15, wherein the rotatable latching wall includes:
a first actuating member positioned along a first edge portion of the receiving slot, corresponding to an inner surface of the first lateral wall, with a first end portion of the first actuating member being rotatably coupled to the first lateral wall;
a second actuating member positioned along a second edge portion of the receiving slot, corresponding to an inner surface of the second lateral wall, with a first end portion of the second actuating member being rotatably coupled to the second lateral wall; and
a cross member positioned along a third edge portion of the receiving slot, corresponding to an inner surface of the opening, the cross member extending between a second end portion of the first actuating member and a second end portion of the second actuating member.

18. The charging port of claim 17, wherein, in a first position of the rotatable latching wall,
the cross member is positioned in a recess formed in the receiving slot, adjacent to the opening into the receiving slot,
the first actuating member extends upward from the cross member, such that the second end portion of the first actuating member is positioned in a first cavity defined by the inner surface of the first lateral wall and a first top surface extending from a top of the first lateral wall into the receiving slot, and
the second actuating member extends upward from the cross member, such that the second end portion of the second actuating member is positioned in a second cavity defined by the inner surface of the second lateral wall and a second top surface extending from a top of the second lateral wall into the receiving slot,
such that, in the first position, the rotatable latching wall is positioned at an angle in the receiving slot.

19. The charging port of claim 18, wherein
the first actuating member is configured to be actuated in response to insertion of a first rail of the second battery pack into the first cavity, and the second actuating member is configured to be actuated in response to insertion of a second rail of the second battery pack into the second cavity, as the second battery pack is inserted into the receiving slot,
the rotatable latching wall is configured to rotate from the first position to a second position in response to actuation of the first actuating member and the second actuating member, the second position being a substantially horizontal position of the rotatable latching wall in the receiving slot, and
in the second position of the rotatable latching wall, the cross member of the rotatable latching wall is configured to engage a latching portion of a latching mechanism of the second battery pack.

20. The charging port of claim 19, wherein the rotatable latching wall is configured to rotate from the second position to the first position in response to removal of the first rail from the first cavity and removal of the second rail from the second cavity, and the cross member of the rotatable latching wall is configured to disengage the latching portion of the latching mechanism, as the second battery pack is removed from the receiving slot.

* * * * *